United States Patent [19]

Gallagher et al.

[11] Patent Number: 4,965,573
[45] Date of Patent: Oct. 23, 1990

[54] FORWARD LOOKING WINDSHEAR DETECTION SYSTEM

[75] Inventors: Brian J. Gallagher, Elmgrove; Wayne A. Schaefer, New Berlin, both of Wis.; Peter P. Klein, Goleta, Calif.

[73] Assignee: Delco Electronics Corporation, Kokomo, Ind.

[21] Appl. No.: 252,732

[22] Filed: Oct. 3, 1988

[51] Int. Cl.$^5$ .......................................... G08B 23/00
[52] U.S. Cl. ..................... 340/968; 244/181; 340/963; 342/26; 364/433
[58] Field of Search ............ 340/968, 963, 967; 73/128 T, 189; 244/181; 342/26, 53; 364/433, 427, 428; 374/112

[56] References Cited

U.S. PATENT DOCUMENTS

| | | | |
|---|---|---|---|
| 3,935,460 | 1/1976 | Flint | 374/112 |
| 4,079,905 | 3/1978 | Greene | 340/968 |
| 4,342,912 | 8/1982 | Adamson | 364/558 |
| 4,346,595 | 8/1982 | Gary | 342/26 |
| 4,649,388 | 3/1987 | Atlas | 342/26 |
| 4,712,108 | 12/1987 | Schwab | 342/26 |
| 4,725,811 | 2/1988 | Muller et al. | 73/178 T |

*Primary Examiner*—Joseph A. Orsino
*Assistant Examiner*—Brent Swarthout
*Attorney, Agent, or Firm*—Albert F. Duke

[57] ABSTRACT

An integrated, remote sensing and reactive detection system is provided for detecting and confirming the presence of hazardous microbursts, macrobursts, and windshears in the general flight path of an aircraft. An infrared remote sensing system is used to seek out, detect, and provide advanced alerts of thermal gradients ahead of an aircraft which correlate with windshear conditions. The measurement of atmospheric temperature is accomplished by a scanning, multi-spectral radiometer that sweeps an approximate 60 degrees path in front of the aircraft at about a 5 hertz rate. The radiometer employs two rows of detectors that are slightly offset resulting in two simultaneous measurements of temperature that are about 7 degrees apart in elevation angle. This dual information allows the continuous measurement of the atmospheric vertical temperature gradient, or lapse rate, for use in determining the atmospheric stability, and hence the probability of microburst occurrence as well as the continuous measurement of atmospheric azimuth temperature gradient for use in detecting the existence of a negative gradient that correlates with a microburst.

6 Claims, 21 Drawing Sheets

PILOT'S DISPLAY

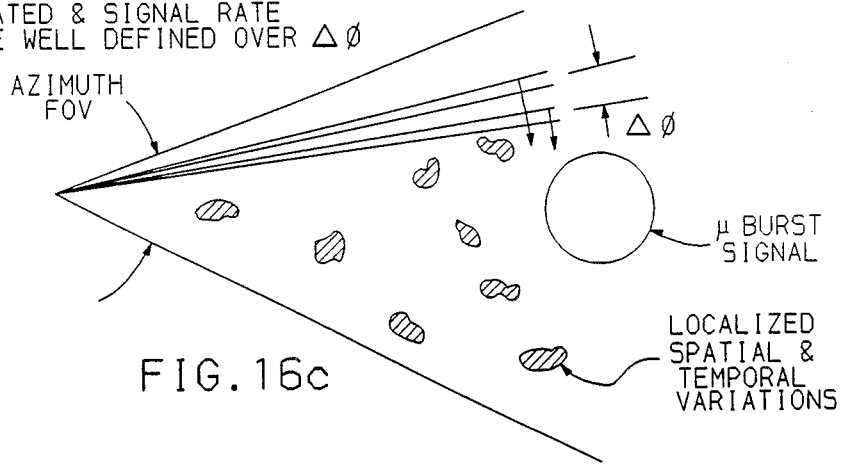
RADIANCE DIFFERENCE SIGNAL
IMPROVED S/N RATIO, IF ATMOSPHERIC NOISE STRONGLY CORRELATED & SIGNAL RATE OF RISE WELL DEFINED OVER $\Delta\phi$
FIG. 16c
RADIANCE DIFFERENCE SIGNAL
$W_i(\phi+\Delta\phi)-W_i(\phi)$
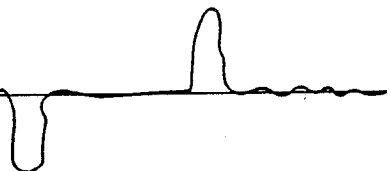
FIG. 16d
INTEGRAL OF RADIANCE DELTA
$\int_0^\phi (W_i(\phi+\Delta\phi)-W_i(\phi))\,d\phi$
IMPROVED S/N RATIO
FIELD ANGLE, $\phi \longrightarrow$
FIG. 16e text continues

FORWARD LOOKING WINDSHEAR DETECTION SYSTEM

FIELD OF THE INVENTION

This invention relates generally to windshear detection systems and more particularly to a passive infrared system for detecting the atmospheric radiance emanating from a microburst which occurs prior to the onset of the low level windshear phenomenon.

BACKGROUND OF THE INVENTION

Windshear refers to a sudden change in wind speed or direction which causes airplanes to lose airspeed and lift. Low level windshear below 1000 feet of altitude is a serious threat to airplanes that are taking off or landing. According to the Federal Aviation Administration, low level windshear has been responsible for 27 aircraft accidents between 1964 and 1985, and has caused 5 accidents in the last decade which resulted in over 500 fatalities. Consequently, windshear is considered a major hazard to aircraft and to air transportation safety.

Windshears are caused by a variety of weather conditions which are related to thermal processes in the atmosphere. These processes produce different air masses with distinct temperature differences. The most severe and unpredictable windshears are caused by a sudden downdraft of cooled air that falls from clouds in the form of a downburst of air and moisture mixed together. This phenomenon is called either a microburst or macroburst depending on its size. Macrobursts are large scale events that produce large diameter gusts of wind as a result of a severe thunderstorm or intense rainfall. In general, these type of strong gust fronts do not represent a life threatening hazard to aircraft, but they still require early recognition and proper flight management procedures in order to maintain safe flight.

A microburst is a relatively small but very intense downburst of evaporatively driven air that can reach speeds of 100 miles per hour. Microbursts range in size from under one mile to over two miles in diameter and normally last for only five or ten minutes. Because of their small scale, they are unpredictable by standard weather forecasting techniques and essentially undetectable by the human eye. When this severe downdraft approaches the ground, increased pressure forces the air out into radial, divergent winds of high velocity. Due to the small diameter of the opposing gust fronts, a plane flying through a microburst experiences a very rapid change of wind direction, or windshear. The divergence of these horizontal winds can be so great that a low flying aircraft can lose sufficient airspeed to stall and crash.

Although microbursts are being intensively researched, there is no complete understanding of how they are triggered. They appear to be related to certain disturbances that occur in the atmosphere during periods of high convective activity, similar to conditions that spawn severe thunderstorms and tornadoes. Also, hail and high altitude snow storms have been connected to the triggering of microbursts, but only when certain atmospheric conditions have already been established.

The common condition that is necessary before a microburst can occur is the development of an unstable atmosphere that approaches a condition of neutral buoyancy. When this condition occurs, particles of air that rise or fall due to thermal density differences with their surrounding air masses tend to stay in motion, rather than to be dampened out by stabilizing forces. Consequently, a large air mass such as a moisture laden cloud that is disturbed (by other atmospheric changes) can become slightly heavier than its ambient environment, and begin to accelerate downward due to gravitational forces. As the moisture laden air and precipitation mixture falls and gains speed, it begins to evaporate at a higher rate causing a temperature decrease which still further increases the density difference between it and the surrounding air. The result of this runaway, cyclic action during unstable atmospheric conditions is a high velocity downburst of air and precipitation that forms the dangerous windshears near the ground.

When the microburst hits the ground embedded in a rainfall, it is called a wet microburst. However, if the air is very dry and the microburst falls from a high altitude, most or all of the moisture within the air mass can evaporate and only the strong vertical downdraft of cool air hits the ground. This condition is called a dry microburst.

There are two general approaches to detecting hazardous windshears that occur in the path of low level aircraft. The first or so-called reactive method, is the only one in current practice aboard aircraft today. This method employs accelerometers which sense the rapidly changing winds by the aircraft's "reaction" to the winds. An associated computer produces a warning if a certain threshold of a calculated windshear hazard is exceeded. The problem with this technique is that the aircraft must first enter the dangerous windshear condition before the accelerometers can detect a changing wind. As a result, there is very little time remaining before the plane must escape the windshear to prevent a crash. This requires immediate action by the pilot to initiate an escape maneuver to allow the plane to gain airspeed and altitude as soon as possible. Due to the reaction time of both pilot and engines, there are some windshear conditions that are inescapable with this technique.

The second detection method is called "Forward Looking" and uses a remote sensor to detect the windshear before the aircraft enters it, allowing sufficient time to avoid the windshear or at least to fly through it at a safe altitude and speed. Several candidate remote sensors are Doppler Radar, Doppler Lidar, and Infrared(IR) systems. The Doppler systems rely on a transmitted beam of electromagnetic energy that is reflected off particles in the divergent air masses (i.e. rain or aerosols) which produces a Doppler shift proportional to the magnitude of the divergent winds. The infrared remote sensing technique, utilized in the present invention, relies on a passive, remote measurement of the atmospheric temperature to detect specific changes or gradients that infer the presence of hazardous windshear conditions.

SUMMARY OF THE INVENTION

The windshear problems is depicted in FIG. 1 where at various stages of aircraft descent along a glide path, the divergent winds caused by a downburst ultimately cause the aircraft to lose airspeed and lift and eventually to crash. The downburst with temperature contours is show in FIG. 2. In accordance with the present invention an integrated, remote sensing and reactive detection system is provided for detecting and confirming the presence of hazardous microbursts, macrobursts, and windshears in the general flight path of an aircraft. As shown in FIG. 3, an infrared remote sensing system is used to seek out, detect, and provide advanced alerts of thermal gradients ahead of an aircraft which correlate with windshear conditions. The measurement of atmospheric temperature is accomplished by a scanning, multi-spectral radiometer that sweeps an approximate 60 degrees path in front of the aircraft at about a 5 hertz rate. The radiometer employs two rows of detectors that are slightly offset resulting in two simultaneous measurements of temperature that are about 7 degrees apart in elevation angle. This dual information allows the continuous measurement of the atmospheric vertical temperature gradient, or lapse rate, for use in determining the atmospheric stability, and hence the probability of microburst occurrence.

The atmosphere becomes unstable when the lapse rate gets close to 5.4 degrees F. per 1000 feet of altitude. This lapse rate is referred to as the dry adiabatic rate and represents a condition of neutral buoyancy. FIG. 4 illustrates stable and unstable lapse rates below and above the dry adiabatic rate respectively. The melting layer height is also illustrated, which is the distance from the ground to where the temperature is at the freezing point. In this region, ice and hail melt and provide evaporative cooling energy to a downburst. This height can be readily calculated by extrapolation, once the lapse rate is known. The absolute moisture concentration (mixing ratio) is also an important variable in the formation of downbursts, and can be calculated from air temperature and relative humidity information. Using the parameters described above, the National Aeronautical and Space Administration (NASA) has developed a procedure to determine the potential severity of a microburst. Based on their studies, a microburst severity index I can be computed by:

$$I = ((Hm (Ts - 0.0055*Hm + Qv(1) - 1.5Qv(Hm))/3)^{0.5})/5$$

Where
Hm = height of melting layer
Ts = surface temperature
Qv(1) = mixing ratio at 1 km altitude
Qv(Hm) = mixing ratio at the melting layer height NASA has shown that severe microbursts are highly improbable when I is less than 25, and are increasingly probable when I is greater than 25. In accordance with the present invention the severity index value is calculated from information obtained by the scanning radiometer and from external sensors on board the aircraft. When the severity index is low, a "clear" indication is given to the flight crews, and when it is high, a "caution" indication is displayed. This arming procedure based on atmospheric stability indices provides method of rejecting false alarms and also gives valuable alerting information to the flight crews concerning the probability of a severe microburst occurring. A strong temperature gradient detected during a stable atmospheric condition (clear mode) will be displayed to the pilot as a potential windshear, but not as a microburst.

FIG. 5a–5c illustrate the forward looking windshear detection system in operation. In FIG. 5a a microburst is shown in the path of an approaching airplane about two miles away. Prior to this point in time, the infrared sensor system has determined that the atmosphere is unstable causing the illuminated lights on the Pilot's Display (FIG. 5c) to switch from CLEAR to CAUTION. The scanning radiometer as it sweeps across the disturbance will detect an azimuth gradient of decreasing temperature that exceeds a threshold value. Furthermore, this information is received simultaneously in three separate channels (FIG. 5b) of filtered radiance (as hereinafter described in greater detail) which will be used to confirm the correct polarity of the gradient and also to estimate the range of the disturbance from the aircraft. The azimuth, range and intensity information generated in the Computer Unit will be used to position a symbol on the Pilot's Display indicating a microburst. At the same time, the illuminated lights will switch from CAUTION to WARNING confirming the presence of a hazardous windshear condition. The inertial reactive sensor, which is coupled to and receives information from the infrared sensor, is used to confirm the presence of a windshear or as a backup to the remote sensor under atmospheric conditions which may prevent reliable remote detections.

The forward looking windshear detection system consists of three major components; an Infrared(IR) Sensor Unit, an Inertial Sensor Unit, and an Integrating Computer Unit. The Infrared Sensor uses remote sensing techniques to detect temperature changes in the atmosphere ahead of the aircraft. This information is transmitted to the Integrating Computer unit where the signal processing and computations are done to determine if a dangerous windshear event is occurring that could impact the approaching aircraft. The Inertial Sensor Unit detects the accelerations being experienced by the aircraft and this information is also sent to and is processed by the Integrating Computer Unit. The Infrared information extracted by the Computer is also used to adjust the inertial (reactive) sensing algorithms when an apparent windshear is detected ahead of the aircraft. This allows a "hair trigger" sensitivity adjustment to the inertial detection circuitry to allow an advanced reactive warning.

The Infrared Sensor is a multi-spectral, scanning radiometer that measures radiant energy (radiance) of the atmosphere and converts this information into equivalent temperature units. The IR sensor is an optical device that must be mounted external to the aircraft skin, allowing an unobstructed forward field of view. Radiant energy is received through a small, infrared window over an approximate 60 degree horizontal field of view through the use of a scanning mirror apparatus, and then focused on an array of integrated filter/detector devices where it is converted to an electrical analog.

The integrated array consists of two rows of 5 (or more) filter/detectors that are separated by a distance equivalent to an elevation angle of approximately 7 degrees. This results in a continuous serial-parallel scan of the atmosphere over a horizontal (azimuth) distance of 60 degrees and a vertical (elevation) distance of 7 degrees. As previously discussed, the stability of the atmosphere is primarily a function of the atmospheric vertical temperature gradient, or lapse rate. Therefore, the atmosphere vertical elevation gradient signals are used to measure the lapse rate of the atmosphere to arm the detection system accordingly, while the horizontal azimuth gradient signals are used to actually detect temperature gradients that correlate with windshear events.

The integrated filter/detector array receives energy contained in 5 specific bandpasses over the standard Far IR Window (nominally considered as between 8 to 14 micrometers in wavelength). This filtered radiant energy can be considered as being received at 5 specific wavelengths since the filters have narrow bandpasses of approximately one micron ($1 \times 10^{-6}$ meters). This separation of the filtered energy into 5 distinct wavelengths allows control of the effective range that each filter "sees", thereby providing a means of estimating the distances from the aircraft that each filtered energy represents as shown in FIG. 6. Note that the percent of transmittance of infrared energy through the atmosphere depends on its wavelength, due to the wavelength sensitive atomic absorption properties of atmospheric gases such as $CO_2$ and $H_2O$ (water vapor).

The operating wavelengths selected in accordance with the present invention, are along the trailing edge of the atmospheric $CO_2$ absorption band (from 10 to 14 microns) and represent atmospheric transmittances inversely proportional to their wavelength (i.e., as wavelength increases, transmittance and effective range decrease). Accordingly, the lower wavelength filters receive energy much farther away from the aircraft than the higher wavelengths, which receive energy very close to the aircraft. In effect, the low wavelength filters act as forward detection channels, while the high wavelength filters act as reference channels indicating conditions immediately in front of the airplane. The three lower wavelengths ($\lambda 1$, $\lambda 2$, $\lambda 3$) are used as detection channels and the two higher wavelengths ($\lambda 4$, $\lambda 5$) are used as reference channels. Although the present invention employs 5 channels of filtered radiance, only 3 channels are used at any one time including 2 detection channels and 1 reference channel.

In addition to wavelength dependency, the transmittance of radiant energy through the atmosphere also depends on the total concentration of gases in the atmosphere (pressure) and on the specific concentration of water vapor (moisture). The total of 5 channels allows a variability to select 3 specific channels (2 detection, 1 reference) according to altitude and/or humidity conditions in existence during system operation, in order to provide more uniform detection distances. Wavelengths $\lambda 1$, $\lambda 2$ (detection), and 4 (reference) form one group of operating channels, and wavelengths $\lambda 2$, $\lambda 3$ (detection) and $\lambda 5$ (reference) form a second group. The selection of which group is chosen to operate is done automatically in the Integrating Computer Unit based on external inputs of altitude (pressure) and absolute moisture concentration (based on relative humidity or dew point temperature). The first group ($\lambda 1$, $\lambda 2$, $\lambda 4$) is used at lower altitudes and at more humid conditions, while the second group ($\lambda 2$, $\lambda 3$, $\lambda 5$) is used at higher altitudes or drier conditions.

BRIEF DESCRIPTION OF THE DRAWINGS

A more complete understanding of the present invention will become more apparent from the following description taken in conjunction with the accompanying drawings wherein like references refer to like parts and wherein:

FIGS. 13d and 13e show further details of the detector array of the IR sensor of FIG. 13a;

DESCRIPTION OF THE PREFERRED EMBODIMENT

Figure 1:
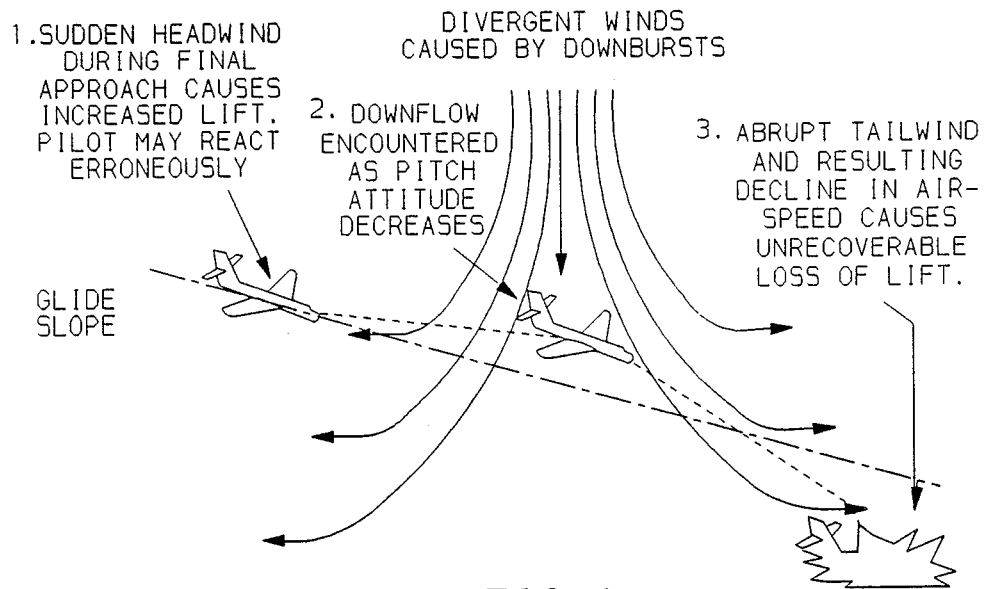
FIG. 1 depicts the windshear problem during an aircraft landing.
Figure 2:
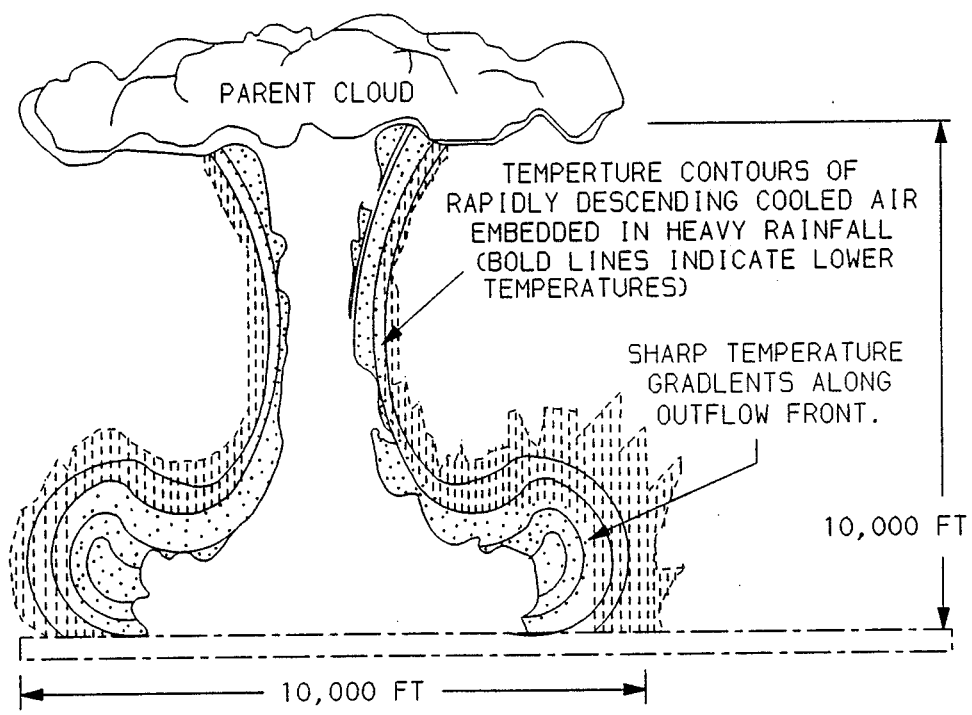
FIG. 2 shows the temperature contours of a downburst.
Figure 3:
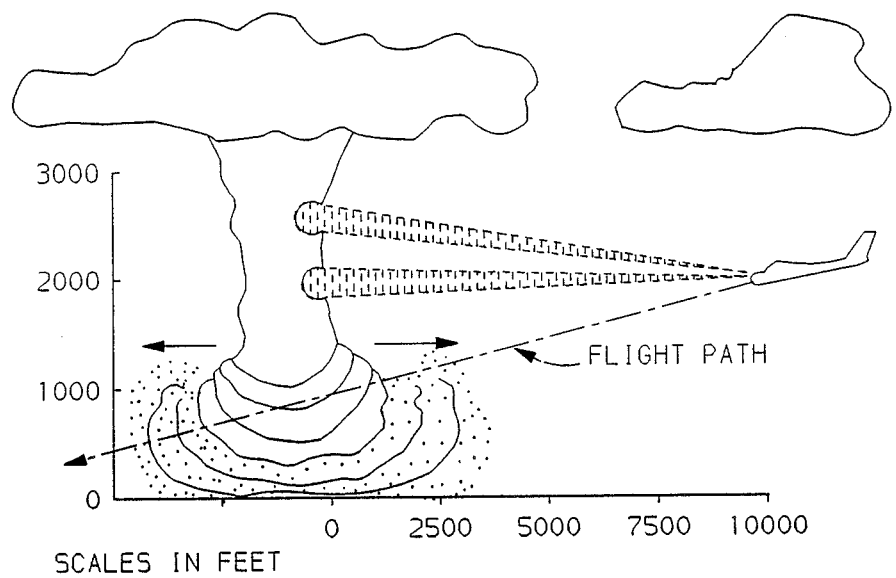
FIG. 3 depicts in pictorial form the infrared detection of a microburst.
Figure 4:
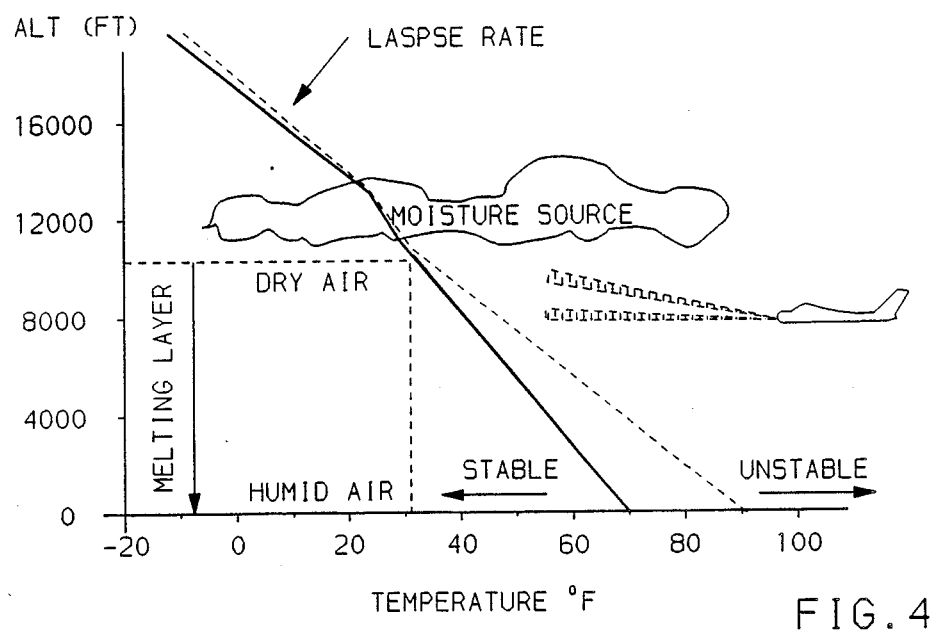
FIG. 4 is a graph of temperature vs. altitude showing lapse rate and atmospheric stability.
Figure 5A:
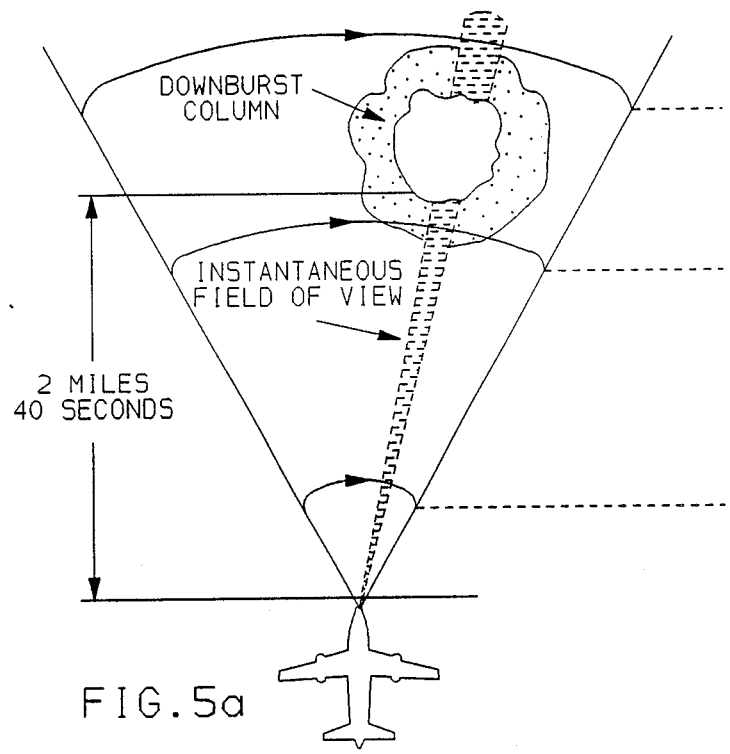
FIG. 5a-5c illustrate the operation of the forward looking windshear detection system of the present invention.
Figure 5B:
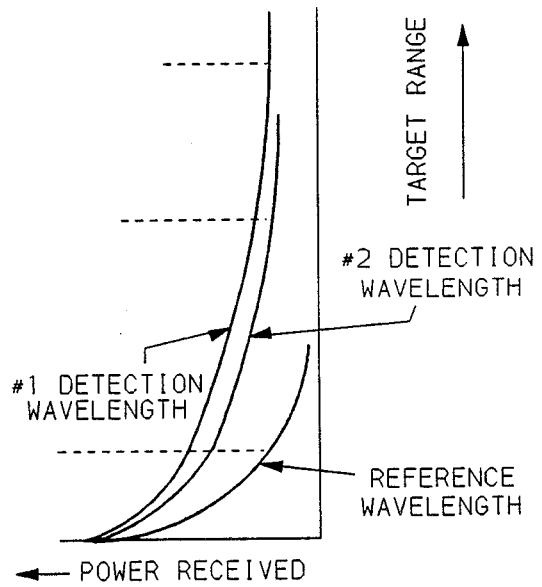
Figure 5C:
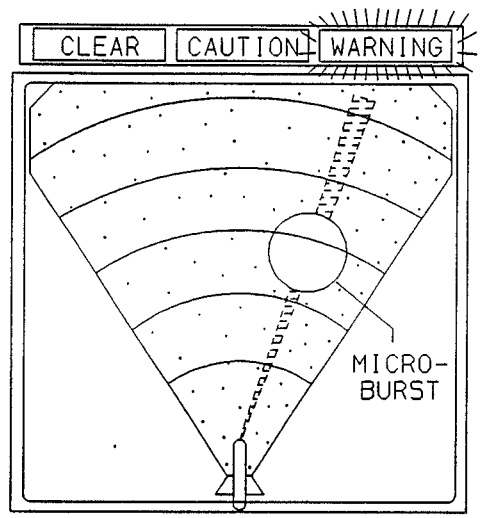
Figure 6:
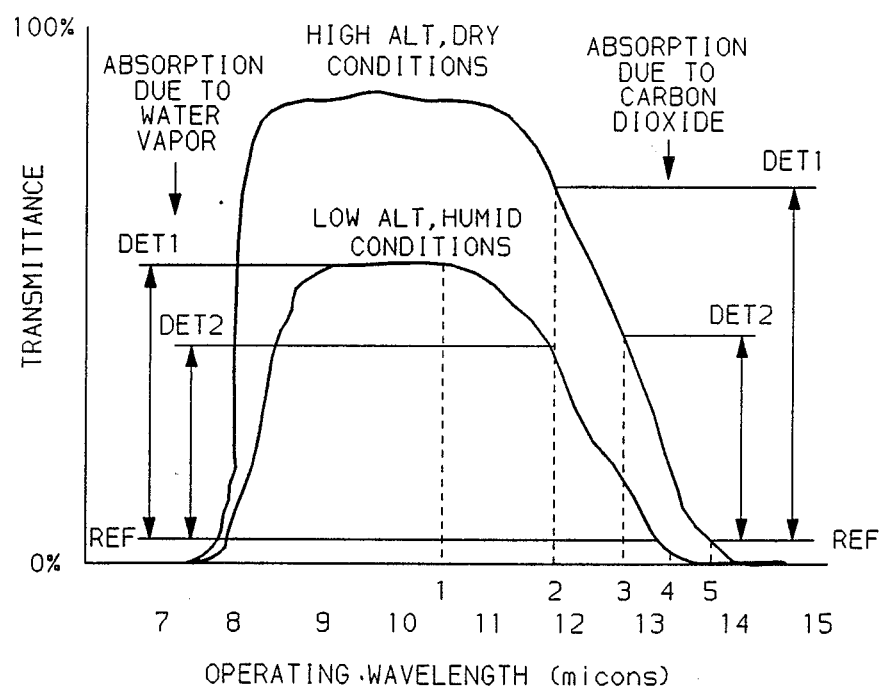
FIG. 6 depicts the transmittance of the detection and reference channel wavelength used in the present invention.
Figure 7:
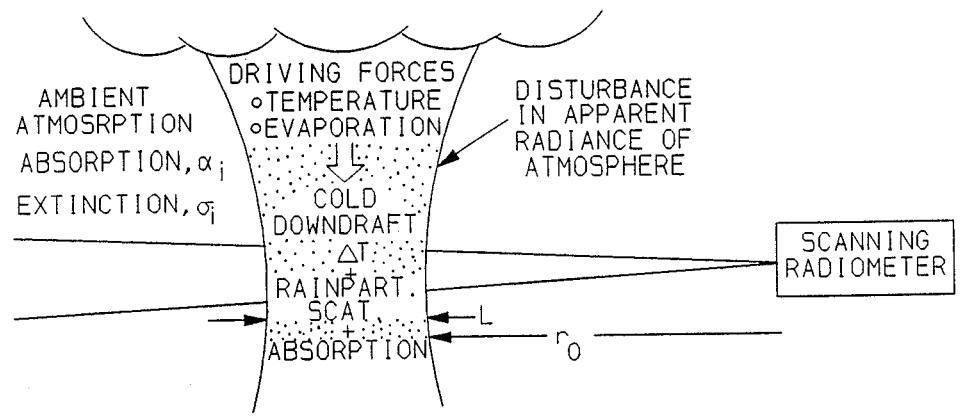
FIG. 7 is a schematic representation of the make-up of a downburst.

As shown in FIG. 7, the downburst is a rapidly descending column of heavier cold air which occurs under unstable atmosphere conditions. Its velocity is sustained by evaporative cooling from embedded rain particles. Downbursts with column diameters of less than 4 km are classified as Microbursts, with those of larger dimension classified as Macrobursts. Microbursts are the most difficult to detect with current systems and are the primary threat due to greater shear magnitudes and aircraft dynamic limitations at low altitudes.

In the absence of significant temperature variations the apparent radiance of the atmosphere in the IR spectrum along a horizontal path is relatively constant with azimuth angle. Within a downburst column, however, it has been observed that the air temperature is reduced by approximately 0.3 degree C. per knot of vertical wind. This temperature difference (typically $-6$ degrees C. for a wind of 20 knots) produces a negative change in the apparent radiance of the column compared to the undisturbed atmosphere background. Analysis has shown this radiance difference to be approximately as follows:

$$\Delta W_{si} \cong W_b(\lambda_i, T) \frac{4\Delta T}{T} \underbrace{[1 - e^{-(\sigma_{ai} + \sigma_{ri})L}]}_{\text{EMISSIVITY}} \underbrace{e^{-\sigma_{ai} r_o}}_{\text{TRANSMISSION}} \quad (1)$$

where
$\lambda_i$ is the infrared wavelength
$\Delta T$ is the temperature difference
$T$ is the ambient temperature
$L$ is the width of the column
$r_o$ is the range to the column $W_b(\lambda_i,T)$ is the black body radiance at wavelength, $\lambda_i$ $\sigma_{ai}$ is the atmospheric extinction at $\lambda_i$ $\sigma_{ri}$ is the increase in extinction in the column due to additional moisture and rain particles As shown in the equation the signal is proportional to the temperature difference, the equivalent emissivity of the column and the atmospheric transmission. Typical minimum signal amplitudes on the order of 1.5 degrees are apparent at the radiometer. Detection by Horizontal Scanning.

Figure 8A:
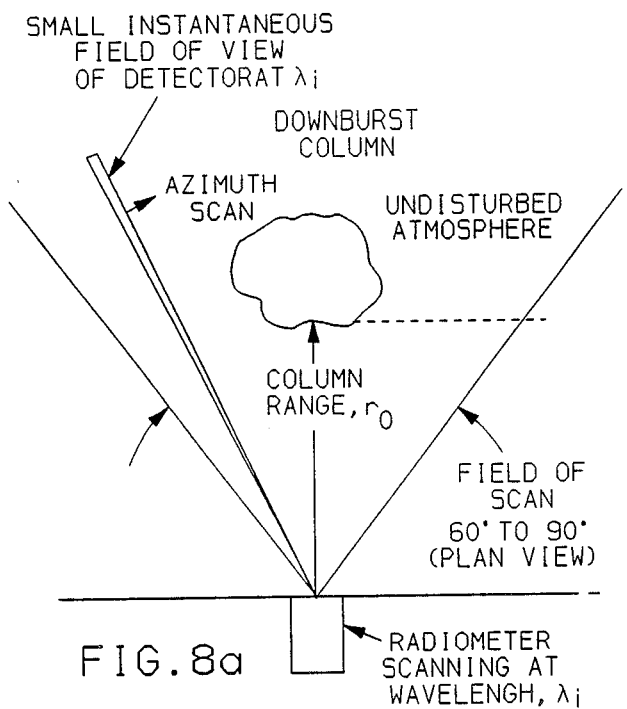
FIGS. 8a and 8b show the sensitivity vs. range plot at $\lambda_i$ for a scanning radiometer with a downburst column at range $r_o$.

As shown in FIG. 8a a radiometer which scans in azimuth, detects and measures the signal radiance from a downburst. The signal is generated by an IR detector which senses radiance within in a small (approximately 1 degree) instantaneous field of view (IFOV) which is scanned horizontally across the downburst column. The signal sensitivity of the radiometer to the downburst range is the atmospheric transmission as illustrated on the right side of FIG. 8a. Azimuth scanning provides more rapid detection, reduced coupling of atmospheric noise, more effective signal discrimination, permits discrimination of Microbursts from large, less threatening gust fronts and thus permits a reduction in the frequency of false alarms.

Figure 8B:
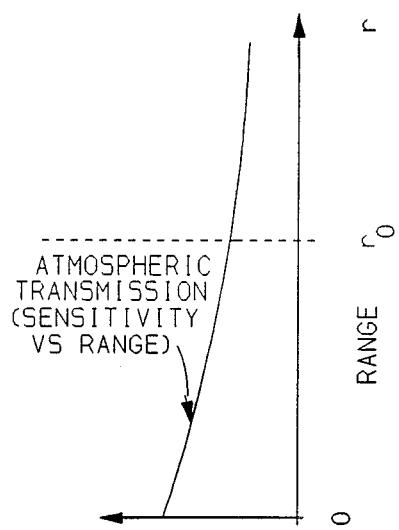
Figure 8C:
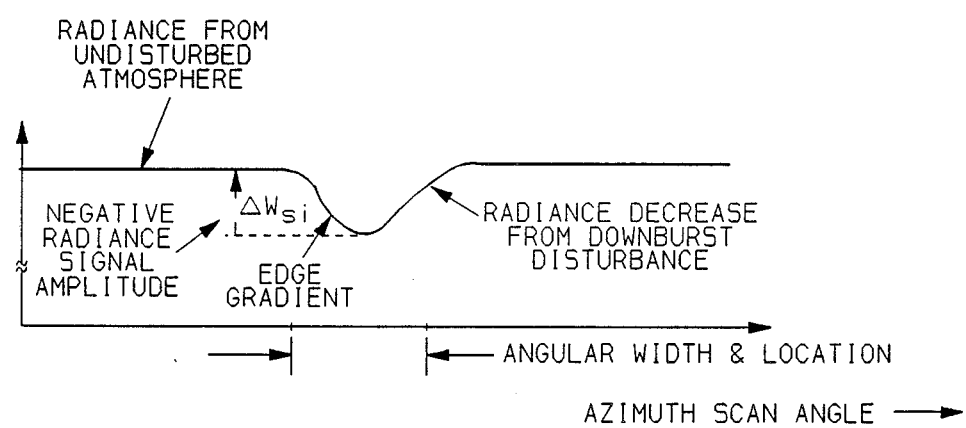
FIG. 8c shows the signal response from the radiometer.

As shown in FIG. 8b the resulting negative radiance signal is used to detect and identify the downburst and derive information on its location and intensity. Important signal characteristics include negative polarity, amplitude, azimuth gradient, angular position and angular size. The localized cross section of the Microburst produces a significant azimuth gradient in radiance. As the IFOV sweeps across the microburst there is a rapid change in temperature difference and apparent width, which directly affects emissivity. By estimating range and atmospheric transmission, the azimuth gradient in equivalent temperature per azimuth angle can be converted to an equivalent rate of change of temperature versus lateral distance, which is a direct measure of the intensity of the windshear.

Figure 9A:
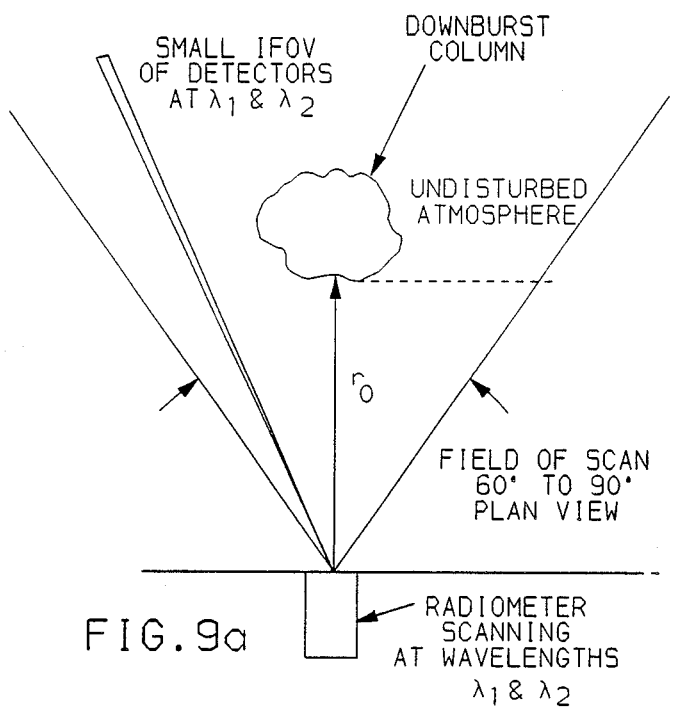
FIG. 9a and 9b show the sensitivity vs. range plot at $\lambda_1$ and $\lambda_2$ for a scanning radiometer with a downburst column at range $r_o$.
Figure 9B:
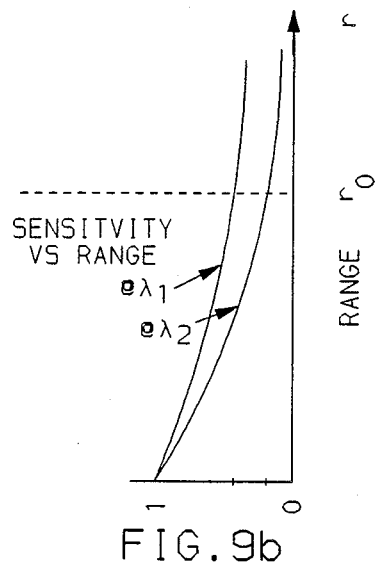
Figure 9C:
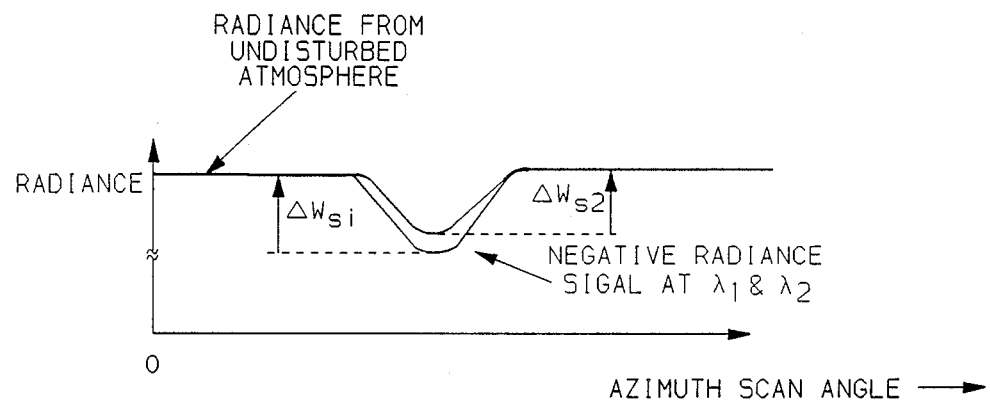
FIG. 9c shows the signal response from the radiometer.

It can be shown from equation (1), that to obtain maximum signal over ranges (i.e. 2 to 5 km) and column widths (1 to 10 km) of interest, it is necessary to operate at wavelengths where the atmospheric extinction is in the range from approximately 0.2 to 0.5 inverse km. Although numerous wavelength bands in IR spectrum are possible, the CO2 and H2O absorption region from 10 to 14 microns is currently preferred. Range Estimation It is noted from the atmospheric transmission term in equation (1) that the signal is dependent upon range. The radiometer is mechanized to scan in azimuth simultaneously at two wavelengths (or wavelength intervals) as indicated in FIG. 9a. Where the atmospheric extinction differs, signals of correspondingly different amplitudes are observed as shown in FIG. 9b. From the ratio of the signal amplitudes it is possible to calculate the approximate range of the downburst, where from equation (1) at wavelengths $\lambda_1$ and $\lambda_2$, $$r_o \simeq -\frac{\ln\left[\frac{\Delta W_{s1} W_b(\lambda_2,T)[1 - e^{-(\sigma_{a2}+\sigma_{r2})L}]}{\Delta W_{s2} W_b(\lambda_1,T)[1 - e^{-(\sigma_{a1}+\sigma_{r1})L}]}\right]}{\sigma_{a1} - \sigma_{a2}} \quad (2)$$

Figure 10:
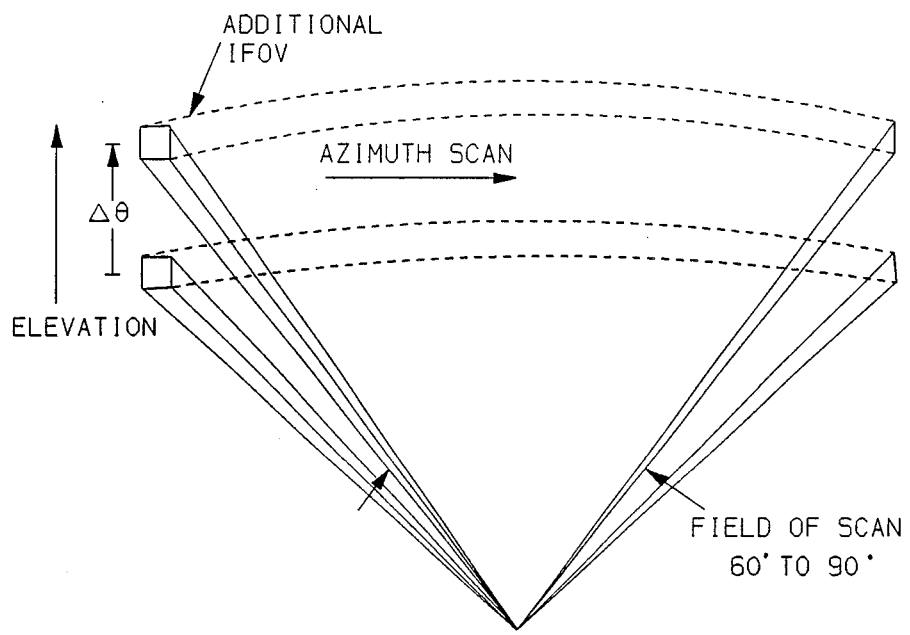
FIG. 10 illustrates the use of two instantaneous fields of view to measure vertical radiance gradient.

For Microbursts, which have the smallest column width, it has been determined that there is sufficient additional extinction in the downburst column (from absorption due to moisture and scattering from rain particles) that the ratio of emissivities at the two wavelengths is very nearly unity. In equation (2) the black body radiance can be calculated from the known wavelengths of operation and independent air temperature measurement. The difference in extinction coefficients, $(\sigma_{a1}-\sigma_{a2})$, can be shown to be approximately equal to the difference in absorption. (This is true because extinction is the sum of absorption and scattering, and in the 10 to 14 micron region, scattering at two near wavelengths is approximately equal.) The absorption coefficients at the two wavelengths can be accurately calculated from CO2 and H2O IR absorption models, given independent measurement of temperature and relative humidity. Overall range estimation accuracies with an error of 10 to 20 percent appear feasible, which is acceptable for an aircraft based sensor. Measurement of Atmospheric Lapse Rate As shown in FIG. 10, the addition of a second IFOV makes it is possible to simultaneously measure the vertical gradient of the atmosphere and determine the Lapse Rate. The Lapse Rate together with measured relative humidity and air temperature permits an estimation of the instability of the atmosphere or the likelihood and potential severity of a Microburst. This is used to caution the pilot and arm and sensitize the detection system. This permits staged alerting to be achieved and reduces the potential for false alarms.

The IFOV's are separated in elevation by approximately 7 degrees. For small elevation angles above the horizontal the radiance of the atmosphere as a linear function of elevation angle as follows:

$$W_{ai}(\theta) = W_b(\lambda_i,T)\left[1 + \frac{4A\theta}{\sigma_{ai}T}\right] \quad (3)$$

where A is the Lapse Rate in degrees C. per km.

The difference in radiance over the fixed angle $\Delta\Theta$, is $$\Delta W_{ai}(\Delta\theta) = W_b(\lambda_i,T)\frac{4A\Delta\theta}{\sigma_{ai}T} \quad (4)$$

From equation (4) is possible to calculate the Lapse Rate if the atmospheric extinction, $\sigma_{ai}$ is known. The other parameters are known or can be calculated as described earlier. For most conditions, in the 10 to 14 micron band, for $\sigma_{ai} > 0.2$ inverse km, the absorption is a high percentage (i.e. greater than 80%) of the total extinction. The absorption coefficient can be calculated as described above and used with an estimate for scattering to estimate extinction.

By simultaneous measurement at wavelengths $\lambda_1$ and $\lambda_2$ it is possible to obtain further estimates of Lapse Rate from equation (4). If $\sigma_{a1} > \sigma_{a2}$, the Lapse Rate calculated at $\lambda_2$ will be an average over a longer and higher path in the atmosphere.

Another expression for estimating Lapse Rate can be derived from the 2 independent measurements and equation (4) as follows:

$$A = \frac{(\alpha_{a1} - \alpha_{a2})}{4\Delta\theta\left[\frac{W_b(\lambda_1,T)}{\Delta W_{a1}(\Delta\theta)} - \frac{W_b(\lambda_2,T)}{\Delta W_{a2}(\Delta\theta)}\right]} \quad (5)$$

where as before $(\sigma_{a1}-\sigma_{a2})=(\alpha_{a1}-\alpha_{a2})$

The vertical gradient of the radiance is also useful in the system mechanization for compensating for sensor attitude errors relative to a horizontal plane. Measurement of Atmospheric Extinction The total extinction (sum of absorption and scattering) can be estimated by IR atmospheric models integrated in the system computer software. Although scattering is normally a small portion of the total extinction for the wavelength and operating conditions envisioned, it is difficult to model accurately. If in descent Lapse Rate is calculated from independent measurements of altitude and temperature, it is possible from equation (4) to independently calculate the atmospheric extinction. Through use of the vertical radiance data gathered simultaneously at two wavelength and equation (4) is possible to form two independent expressions and calculate the absolute value of the extinction coefficients as follows:

$$\sigma_{a1} = \frac{a_{a1} - a_{a2}}{\left[1 - \frac{W_b(\lambda_2,T)\Delta W_{a1}(\Delta\theta)}{W_b(\lambda_1,T)\Delta W_{a2}(\Delta\theta)}\right]} \quad (6)$$

$$\sigma_{a2} = \frac{a_{a1} - a_{a2}}{\left[\frac{W_b(\lambda_1,T)\Delta W_{a2}(\Delta\theta)}{W_b(\lambda_2,T)\Delta W_{a1}(\Delta\theta)} - 1\right]} \quad (7)$$

The accuracy of equations (6) and (7) in practice is dependent on the linearity of the Lapse Rate over the sensitive ranges of the radiometer at $\lambda_1$ and $\lambda_2$.

Additional Wavelengths of Operation

In order to accommodate the anticipated variation in extinction coefficients at specific wavelengths in the CO2 and H2O band from 10 to 14 microns, it is necessary to configure a series of channels with properly selected wavelengths (or wavelength intervals) in a practical system. Variations in H2O content of the atmosphere over the anticipated detection environment require the use of approximately 5 operating wavelength intervals spaced in the band. Based on the apparent conditions and calculated absorption, 2 of the 5 channels with total extinction in the 0.2 to 0.5 inverse km range is selected for detection.

Microburst Discrimination

Figure 11A:
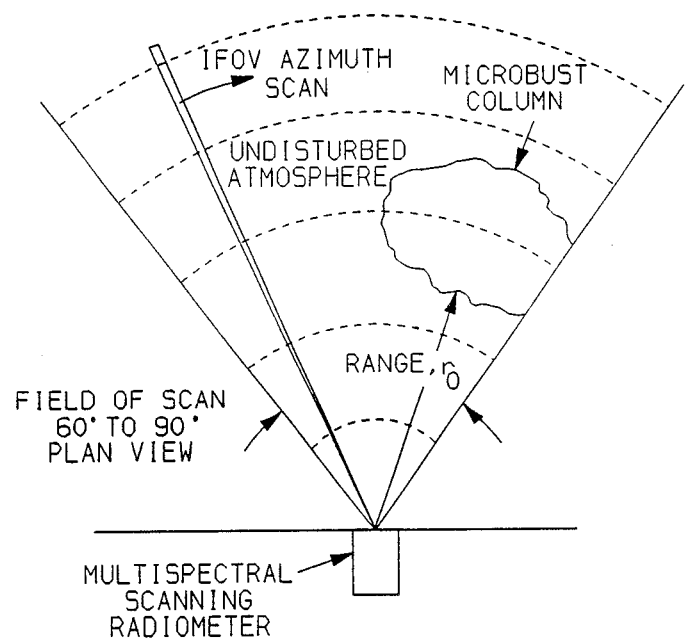
FIGS. 11a and 11b and FIGS. 12a and 12b illustrate the signal radiance respectively to a microburst and a macroburst using the multi-spectral scanning radiometer of the present invention.
Figure 11B:
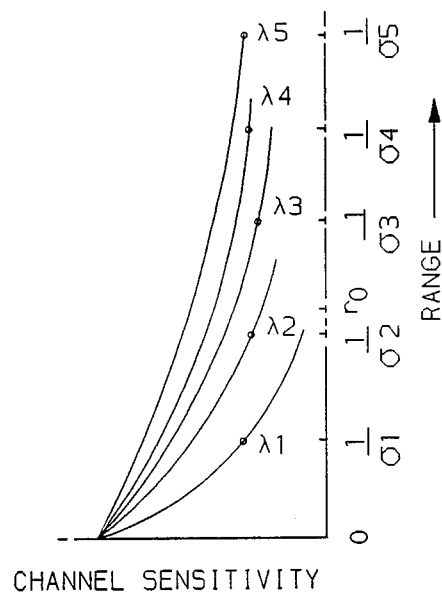

FIG. 11 illustrates detection and identification of a Microburst and the representative response from a 5 channel system. Azimuth scanning and the signal response at one wavelength provide the necessary information for detection. A negative polarity relative to the undisturbed atmosphere and the presence of a signal with sufficient gradient and amplitude permit identification as a microburst. In order to insure that the gradient is present for detection it is necessary that the field of view (FOV) be wide enough to encompass the largest Microburst of interest at important detection ranges. A field of view range from 60 to 90 degrees will accommodate 4 km to 10 km wide downbursts, respectively, at a 2 km range.

Under a specific detection condition, signals from two wavelengths (normally those which provide the maximum response within the 2 to 5 km range interval) are used for detection and to develop a range estimate. As shown in the figure it is possible for a longer channel (i.e. $\lambda_5$) to have a smaller signal than a shorter channel (i.e. $i_4$) as shown. This is due to the possibility of a lower emissivity at the longer channel for Microbursts.

As the apparent size of the downburst signal approaches the dimensions of the FOV, the reference radiance level from the undisturbed atmosphere can be modified or lost in the detection channel. Although the signal gradient and amplitude characteristics can be measured from the data gathered by azimuth scanning at one detection channel wavelength, a final judgment on signal polarity requires a redundant comparison to the shortest range reference channel, which is normally measuring the undisturbed atmospheric radiance between the signal and the sensor.

Figure 12A:
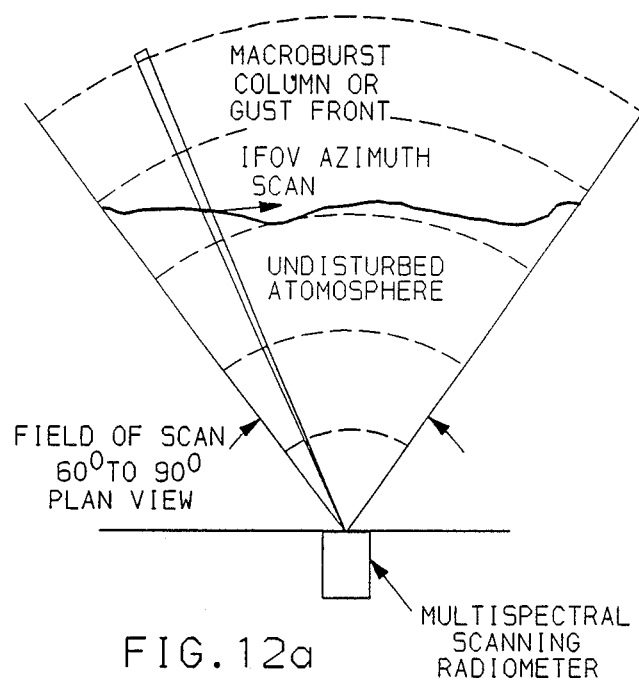
Figure 12B:
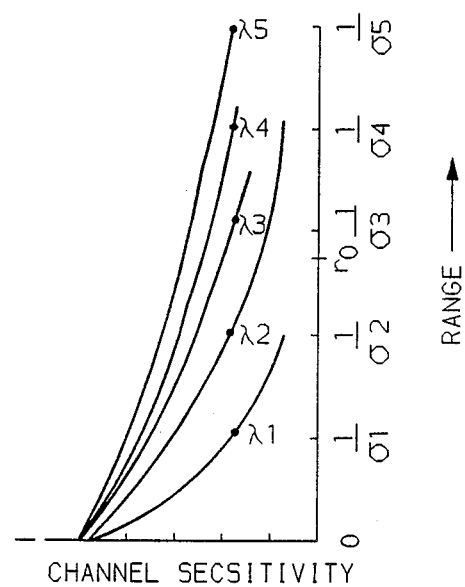

FIG. 12 illustrates the condition for a Macroburst or Gust Front, which is larger than the FOV. In this case a negative signal is expected, but the gradients are not anticipated to be as significant. Detection is based on the apparent reduction in radiance in successively longer channels. The shortest channel can be used as a reference (or measure of the the undisturbed atmosphere) in this case.

System Mechanization

The system functional block diagram is presented in FIG. 13. The system comprises a sensor generally designated which generates and conditions the IR radiance signals and a computer 12 which performs the signal and data processing, interfaces with other sensors and display subsystems and manages the entire system. IR Sensor The IR sensor comprises an objective lens assembly 14, a 2 by 5 element detector array 16 with fixed integral narrow bandpass filters designated $\lambda_1$-$\lambda_5$, preamplifiers 18 multiplexer 28 A/D converter 22 and servo rotating scanning mirror assemblies generally designated 24. The mirror assemblies scan the detector array at least 60 degrees in azimuth and permit plus and minus 15 degrees of line of sight (LOS) control in elevation. There are a number of possible optical scanning techniques, known in the prior art, which can be implemented both before and after the objective lens.

Control signals from the computer drive the azimuth scan at a rate of at least 5 Hz (i.e. beyond frequencies of significant aircraft attitude motion) Elevation control signals from the computer are used to stabilize and offset the line of sight (LOS) relative to a horizontal reference to within approximately 0.2 degree RMS.

Figure 13A:
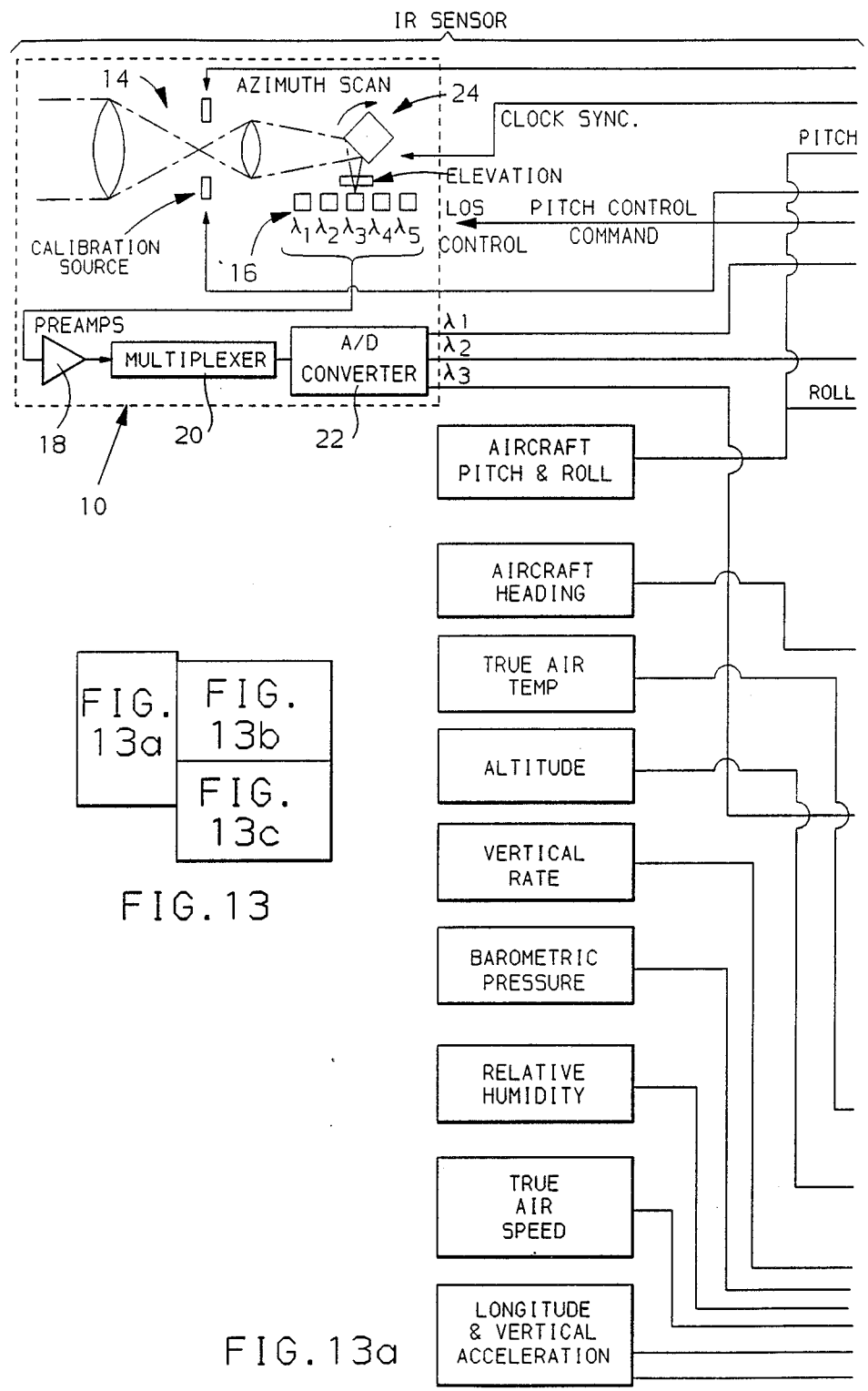
FIGS. 13a-13c show a block diagram of the system of the present invention.
Figure 13B:
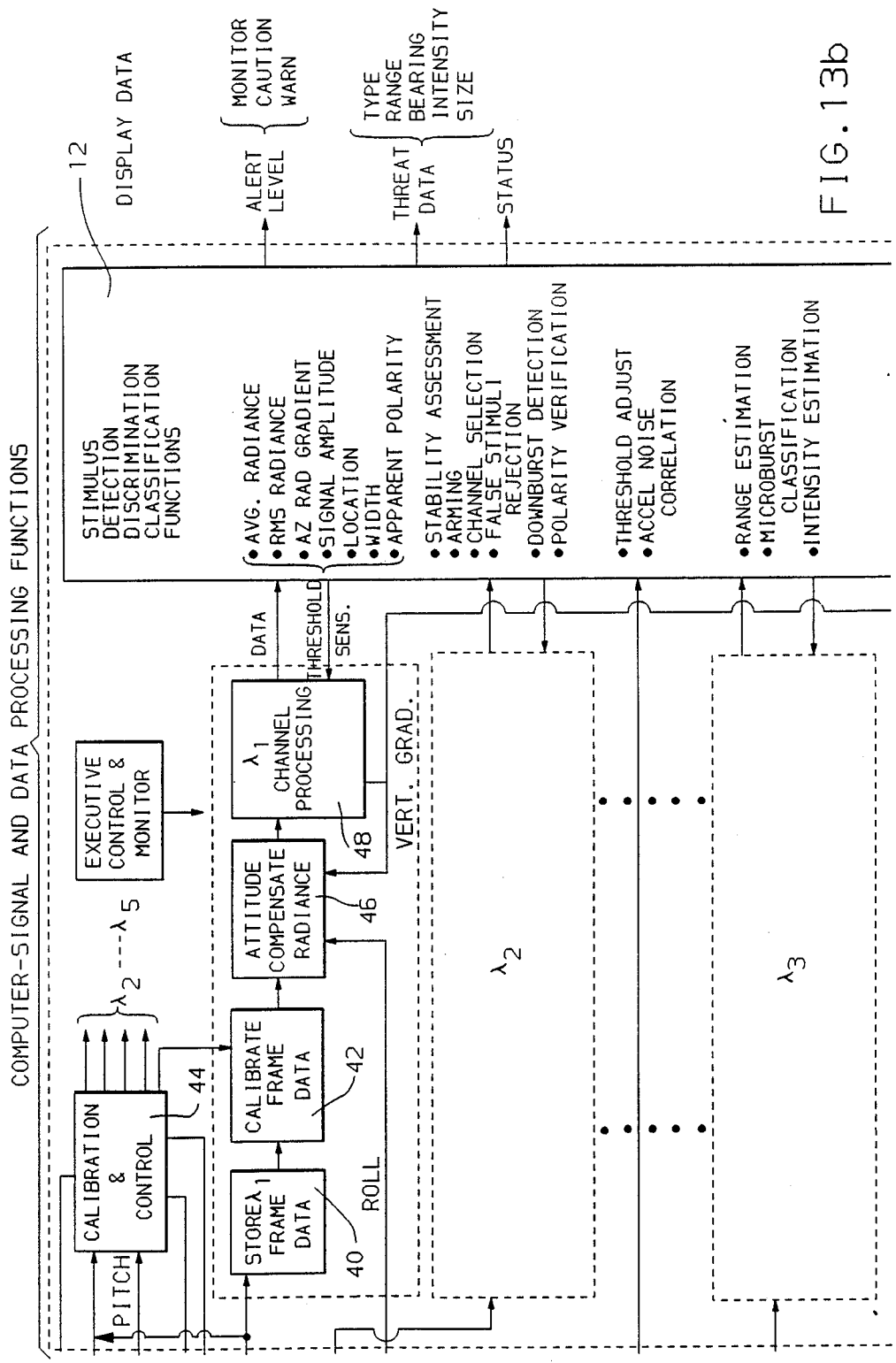
Figure 13C:
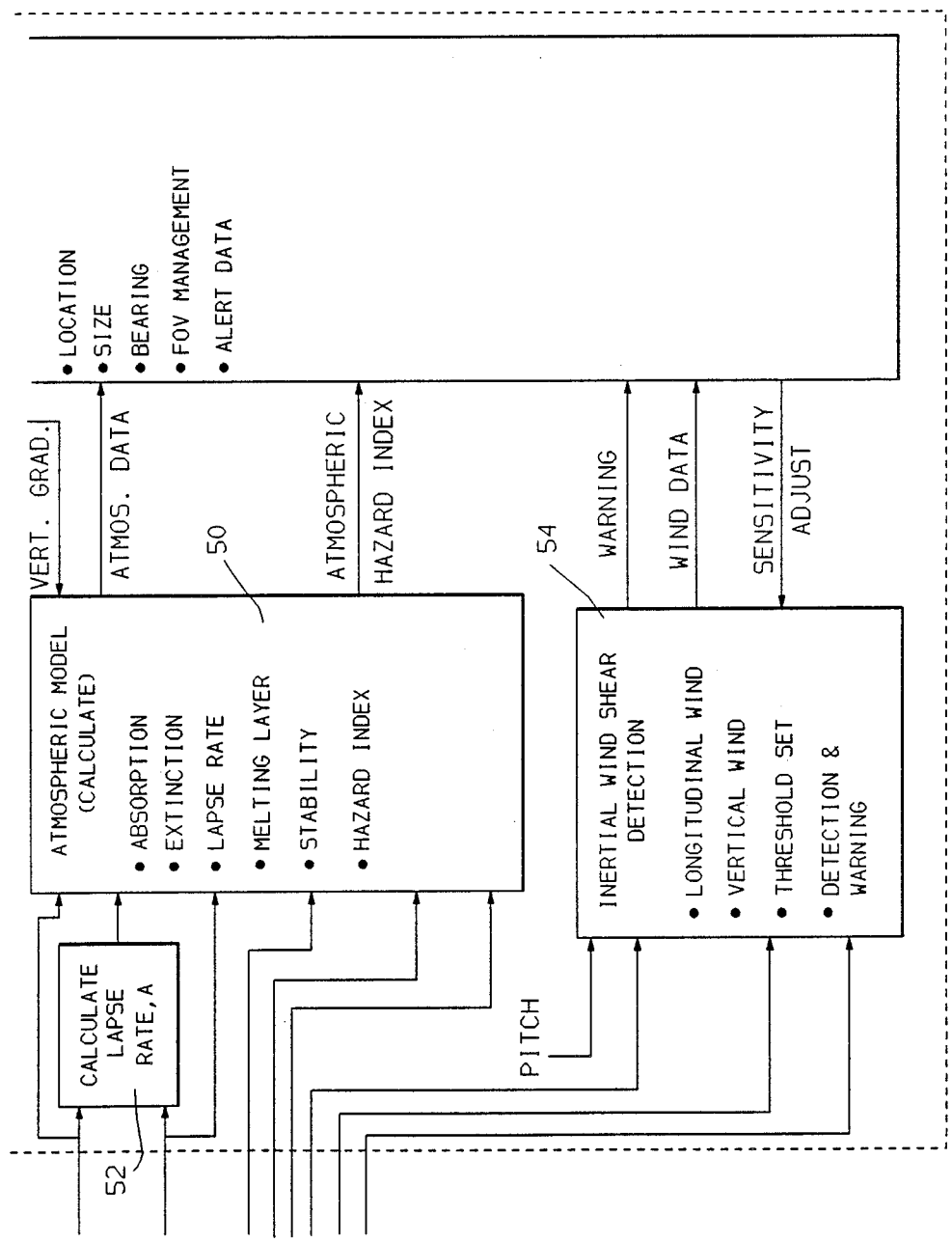
Figure 13D:
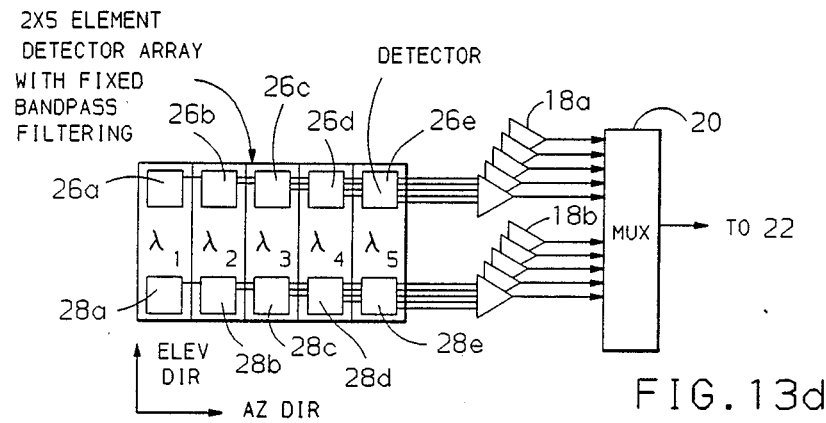
Figure 13E:
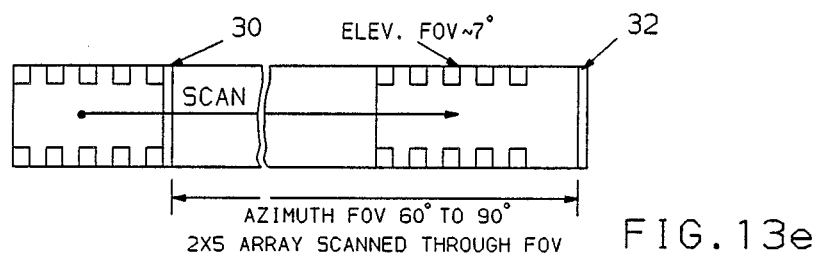
Figure 14A:
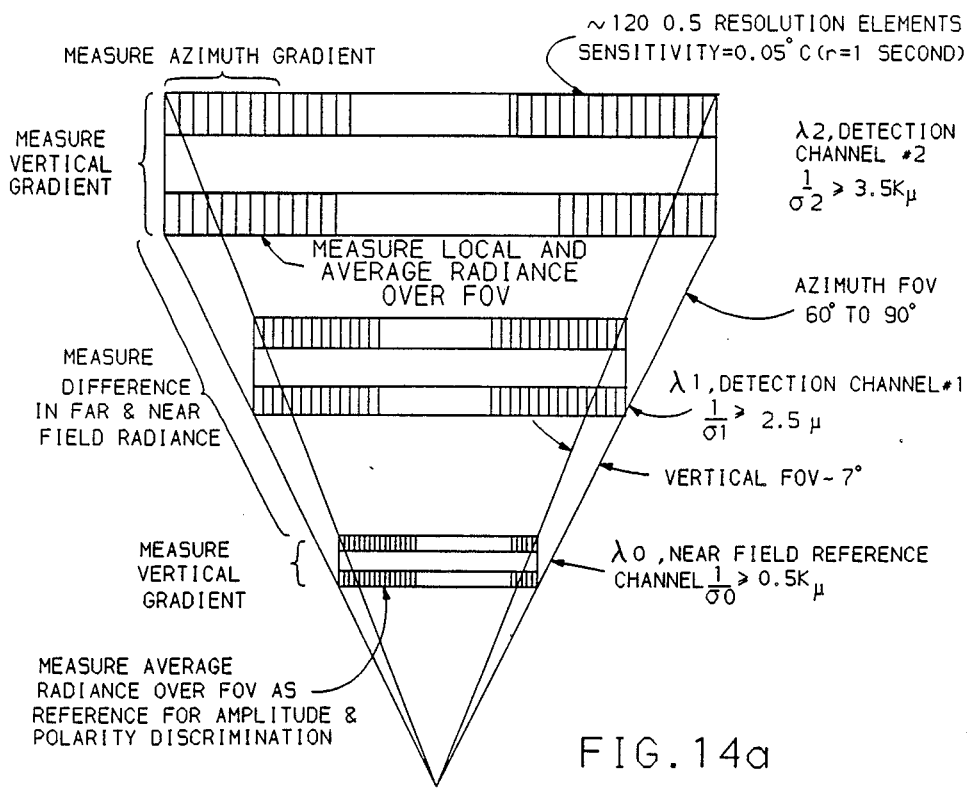
FIG. 14a and 14b show the field of view geometry for the two detection channels and the reference channels.
Figure 14B:
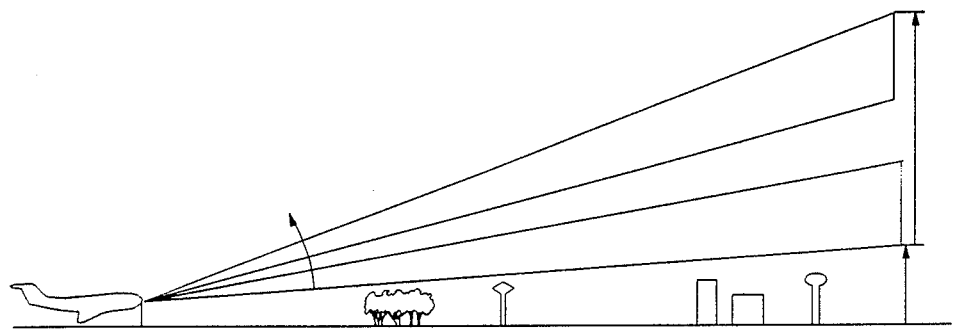

As further shown in FIG. 13d, the array consists of 2 parallel and 5 serially scanned detectors 26a-26c and 28a-28 e. Each pair of vertical detectors has a different fixed filter with bandpass of approximately 0.5 to 1 micron about discrete wavelengths spaced on the 10 to 14 micron band. The detectors are scanned continuously in azimuth A point in object space, therefore, is scanned sequentially at the various wavelengths. The detector IFOV is approximately 0.5 degree azimuth by 1.0 degree elevation, which produces 120 to 180 resolution elements per detector for a FOV from 60 to 90 degrees. FIG. 14 illustrates the resolution elements in space for the detector geometry for 3 of the 5 channels.

Test data indicates that atmospheric background noise within an IFOV and over a 1 second integration time will be of the order of 0.1 to 0.2 degree RMS for representative detection channels. The system is anticipated to be background noise limited. A sensor internal noise equivalent temperature difference (NETD) of less than or equal to 0.05 degrees C per resolution element for an integration time of one second is projected as necessary for this application. Analysis indicates that this can be achieved by the use of either temperature stabilized pyroelectric or cryo cooled HgCdTe detectors.

To provide temperature calibration, small reference sources 30 and 32 are configured internally to the left and right edges of the azimuth FOV (see FIG. 13c). As the detector IFOV's pass over both object space and these reference sources, calibration of the object space radiance is readily achieved by post processing in the computer.

The detectors are ac coupled by scanning, therefore use of a chopper is not required. After individual detector preamplification, the data from the 10 detectors is multiplexed at 20 and converted to digital format for transfer to and processing by the computer 12. The sensor of the present invention is significantly different from the prior art staring radiometer in the following ways:

(1) Wide FOV azimuth scanning (multiple resolution element) vs narrow FOV staring (single resolution element) radiometer (2) Fixed spectral bandpass filtering and detectors which are continuously scanned and provide improved scan efficiency versus use of a series of filters sequentially inserted into the optical path (3) AC coupled versus chopper Signal and Data Processing The general data flow and software functions in the computer 12 are also indicated in FIGS. 13a–13c. The digital data is received and stored for each channel on a frame by frame basis as indicated at 40. The object space radiance data obtained from block 44 is calibrated at 42 based on the calibration reference data.

The data is then compensated for roll attitude changes using the current measured vertical gradient of the atmospheric radiance. For small pitch and roll angles about the horizontal earth reference the radiance measured at a detection wavelength as a function of scan angle is:

$$W_{ai}(\theta_a,\Psi_a,\phi_s) = W_b(\lambda_i,T)\left(1 + \frac{4A}{\sigma_{ai}T}[\Psi_a\sin\phi_s + \theta_a\cos\phi_s]\right) \quad (8)$$

Where $\Theta_a$ is the pitch error in radians $\Psi_a$ is the roll error in radians $\Phi_a$ is the scan angle relative to the center of the FOV Since the vertical gradient of the radiance is formed from prior frame data and averaged, it can be used directly in equation 8 as follows:

$$W_{ai}(\theta_a,\Psi_a,\phi_s) = W_b(\lambda_i,T)\left(1 + \frac{\Delta W_{ai}(\Delta\theta)}{\Delta\theta}[\Psi_a\sin\phi_s + \theta_a\cos\phi_s]\right) \quad (9)$$

It is seen that radiance compensation for both pitch and roll errors is possible on a frame by frame basis in the computer using equation (9). Larger pitch angle compensation is achieved by commanding the pitch mirror servo. The frame data is then signal processed on a channel by channel basis as indicated at 48 to derive various information including the following stimulus detection signals:

(a) Signal Polarity (b) Vertical Atmospheric Gradient (Average)

(c) Average Radiance in Azimuth (d) RMS Radiance Variation in Azimuth (e) Peak Stimulus Signal Amplitude Variation (f) Azimuth Gradient (g) Angular Location and Apparent Width of Stimulus Vertical gradient data from each channel is filtered and sent to the attitude compensation (described above) and atmospheric modeling functions. In the atmospheric model generally designated 50 the lapse rate is computed as described above and as indicated at 52 and also from independent filtered measurements of altitude and true air temperature, if available. The model also computes estimates for the channel absorption coefficients based on temperature and relative humidity data and extinction coefficients as previously described. An atmospheric hazard index is calculated, which is a measure of the instability. This is used in turn to arm the system for detection and control the threshold sensitivity of both IR and Inertial windshear detection functions.

The Inertial windshear function indicated at 54 uses longitudinal and vertical components of aircraft acceleration, pitch and true airspeed to compute apparent vertical and horizontal winds. This function is used as a complement and positive backup to the forward looking system for sensitivity management and for detecting and verifying the actual presence of windshear. Since vertical wind and radiance variations are correlated, it is possible to estimate the amount of radiance noise uncorrelated with winds to use for threshold sensitivity adjustment and false alarm management of the IR detection function. Furthermore, the sensitivity of the inertial warning threshold level can be adjusted consistent with the measured atmospheric instability and when threatening IR signals are detected to permit earlier warning with minimum overall false alarm rate. The sensitivity management functions are part of the system, however the inertial detection function can either be integral or a separate aircraft system. The complementary use of IR and Inertial detection data permits achievement of a higher probability of detection and lower false alarm rate overall than possible with independent systems. The data from each channel is sent to the stimulus detection, discrimination and classification function which performs the following:

(a) Selects the primary channels to be used for detection based on calculated absorption and extinction coefficients (b) Verifies signal polarity based on comparison to radiance from various channels (c) Rejects false stimuli which do not match the Microburst signal criteria based on polarity gradient size and amplitude. (i.e. aircraft which are positive and small in size)

(d) Detects downburst signals and classifies them as Microburst or Macroburst/Gust Front (e) Estimates range to the detected threat (f) Estimates temperature spatial gradient or intensity (g) Establishes threat location and size (h) Arms and sensitizes IR sensor and inertial detection functions based on atmospheric instability (i) Adaptively adjusts threshold levels for stimulus detection based on radiance noise measurements in short range channels (j) Correlates radiance and acceleration noise (k) Assesses and issues warnings (1) Manages resolution elements and field of view based on changes in aircraft heading.

Management of Atmospheric Induced Noise

Spatial temperature variations in the atmosphere will introduce noise in the angular radiance data. To achieve reliable detection and low false alarm rate a signal to noise (after data processing) of at least 6 is desired (>10 preferred). By using azimuth scanning and creating multiple resolution elements in space it is possible to significantly reduce the effects of atmospheric noise from what would be apparent in the single IFOV staring radiometers of the prior art. In addition to time filtering and averaging, it is possible to filter and average in over large spatial regions to further reduce noise. For example, in forming the vertical radiance gradient it is possible to average over 120 resolution elements in the azimuth FOV.

Shorter (higher extinction) channels are expected to have higher atmospheric induced noise than longer channels due to their effective spatial integration over shorter distances (higher spatial bandwidth). If the difference in radiance between a long and short channel is used to establish a sensitivity to gradients in range, the signal will be dominated by atmospheric noise coupled into the short channel. This would be a significant sensitivity limitation for the single IFOV staring radiometers of the prior art.

By using azimuth scanning it is possible to generate the Microburst gradient signal by using a single relatively long channel, which has significantly less atmospheric noise. For example a long channel with a sigma of 0.3 inverse km is likely to have a factor of 3 lower atmospheric noise than a short range channel with a sigma of 3 inverse km. An approximate square root of the spatial size relationship has been observed in test data, which is what should be expected from a white noise phenomenon. In making final judgments on signal polarity (particularly for larger stimuli in the FOV) a comparison to the radiance in a short range reference channel is necessary. With azimuth scanning it is possible to significantly reduce the temperature noise in the short range channel from what would be apparent in a single one degree IFOV by averaging the radiance over a wide portion of the FOV.

As previously indicated, the rate of change in apparent radiance in the atmosphere is due to the natural lapse rate (rate of change of temperature with altitude) and the variation in atmospheric scattering and absorption with altitude along the line of sight. At small elevation angles this rate of change is relatively constant (linear). The scanning IR radiometer of the present invention is configured to measure the radiance and vertical rate of change. The ratio of these measurements is proportional to the ratio of the effective atmospheric extinction coefficient to the lapse rate. If the lapse rate is known, then the extinction coefficient can be calculated and vice versa. If ratios are formed at the two detection wavelengths, the difference in extinction coefficients can also be estimated. This information is used for range estimation and for determination of or correlation with the prevailing CO2/H2O atmospheric absorption conditions. Since scattering is relatively constant over the wavelength intervals of operation, the difference in extinction is approximately equal to the difference in IR absorption at the two wavelengths. This difference in IR absorption can also be redundantly computed from an H2O/CO2 absorption math model, given temperature, the operating wavelengths and relative humidity.

Figure 15A:
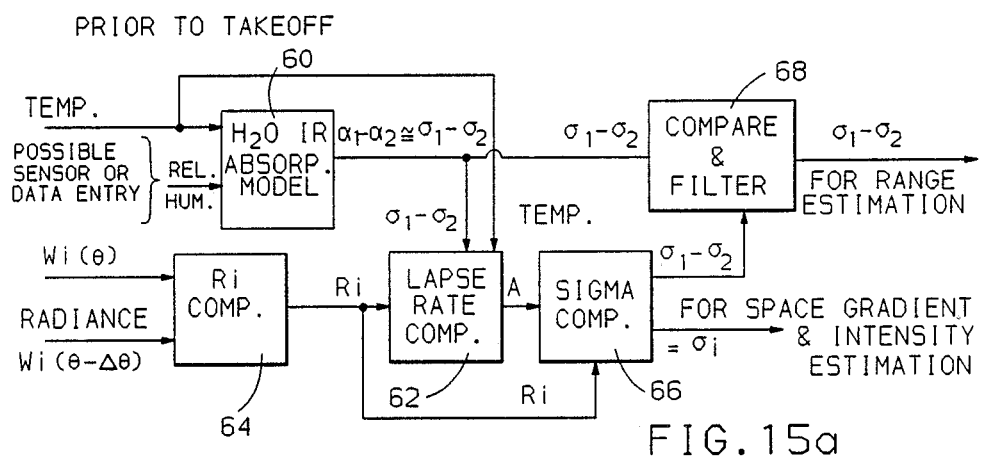
FIGS. 15a and 15b are block diagram depicting the continuous measure atmospheric variables.
Figure 15B:
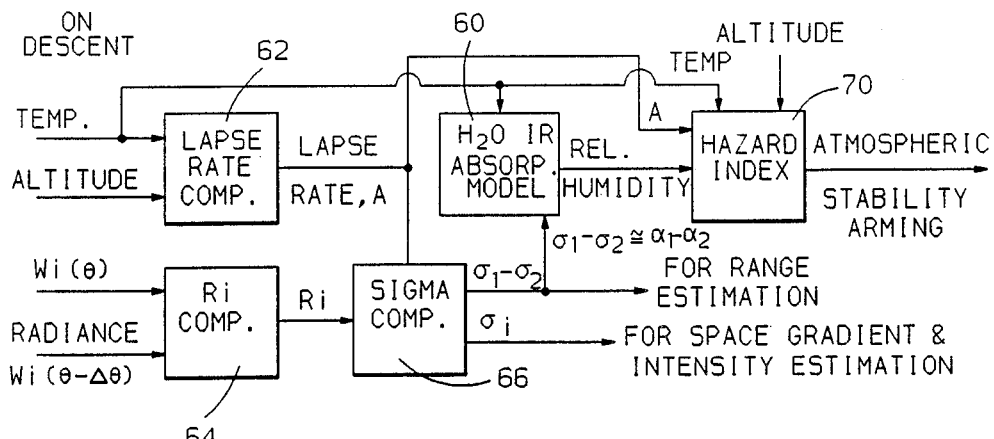
Figure 15C:
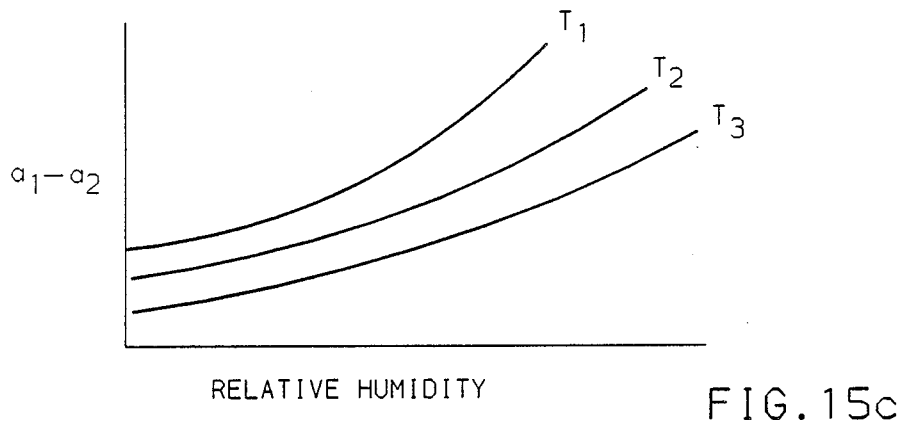
Figure 16A:
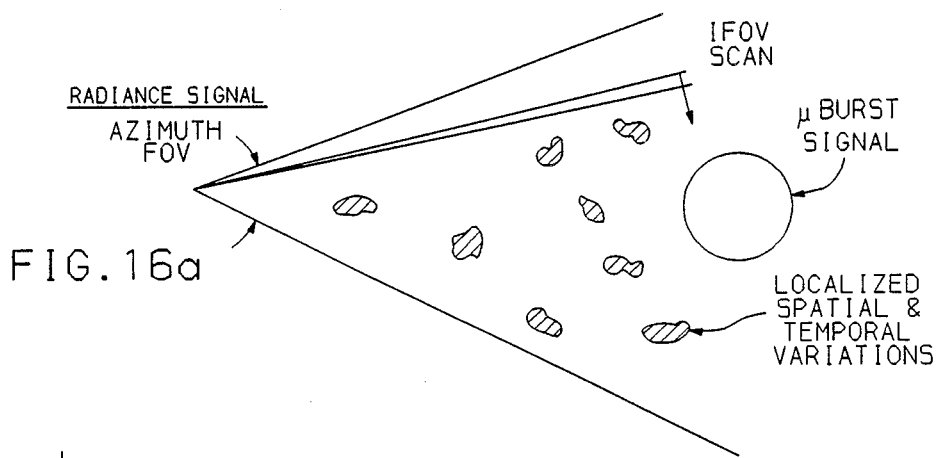
FIGS. 16a-20b are useful in understanding the common mode rejection of atmospheric noise.
Figure 16B:
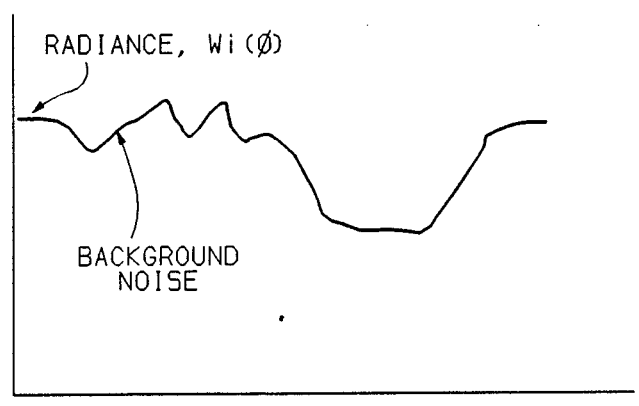
Figure 17A:
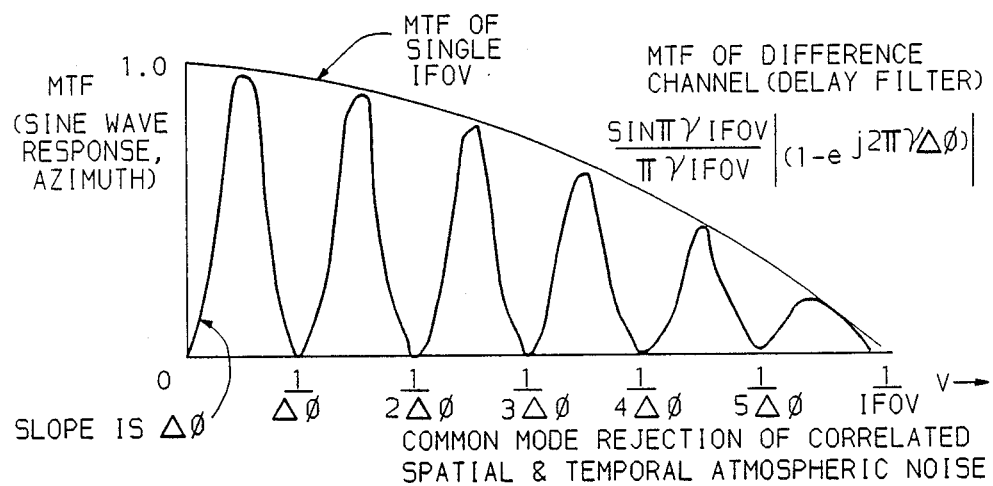
Figure 17B:
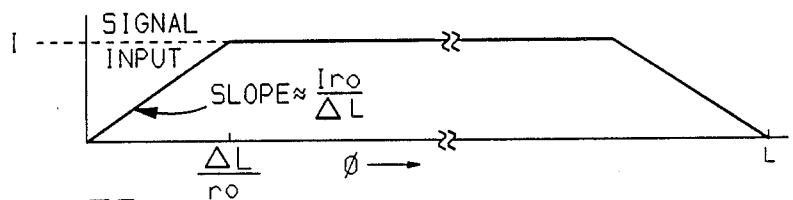
Figure 17C:
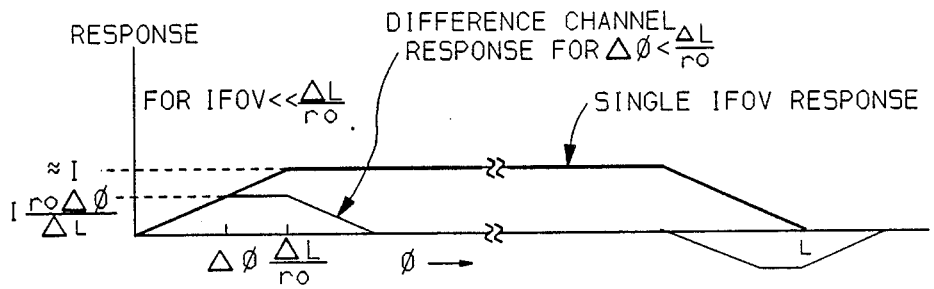
Figure 18A:
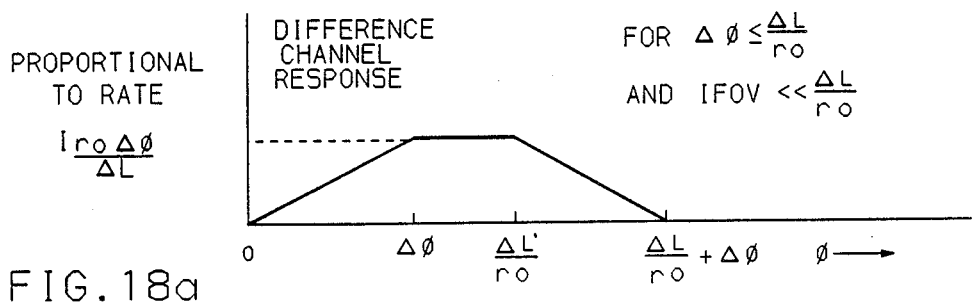
Figure 18B:
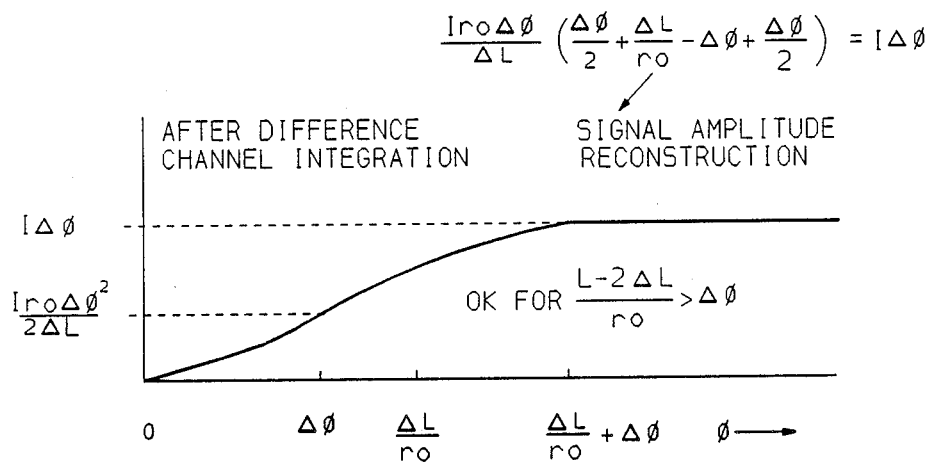
Figure 18C:
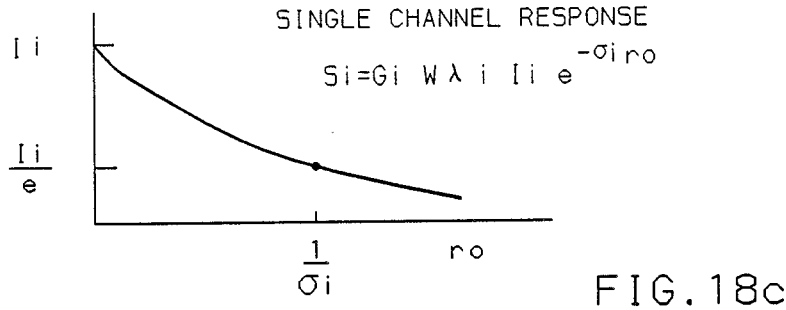
Figure 18D:
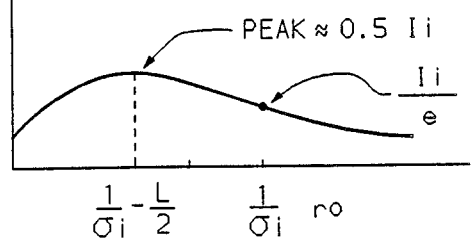
Figure 19A:
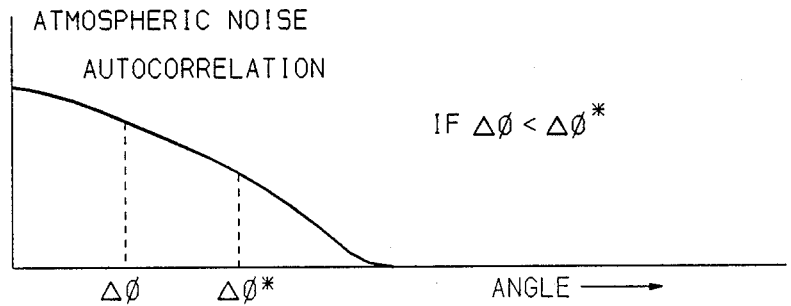
Figure 19B:
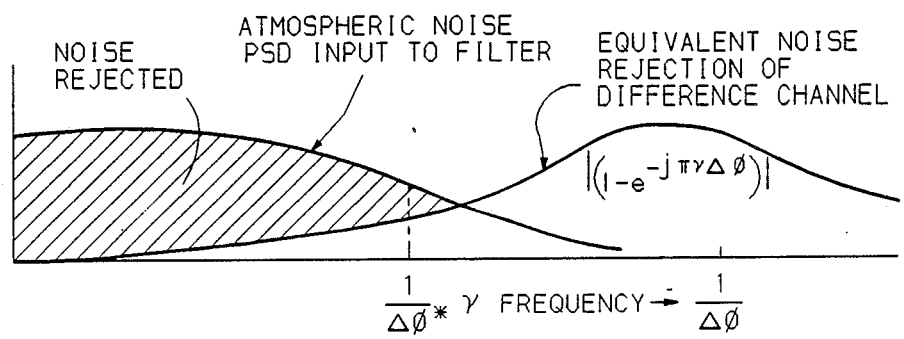
Figure 19C:
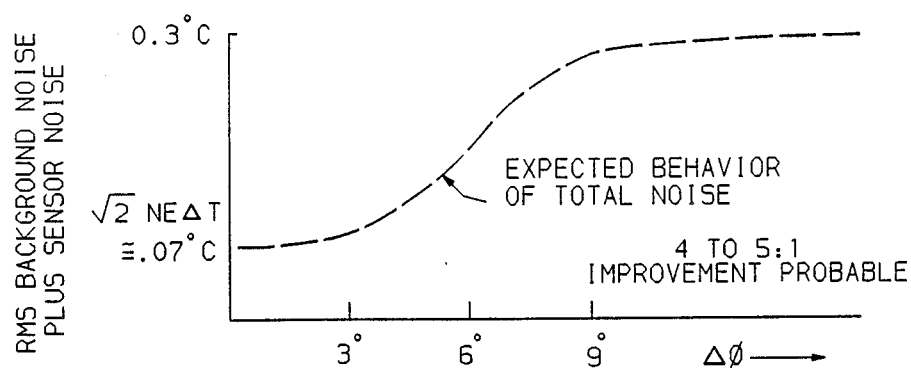
Figure 20A:
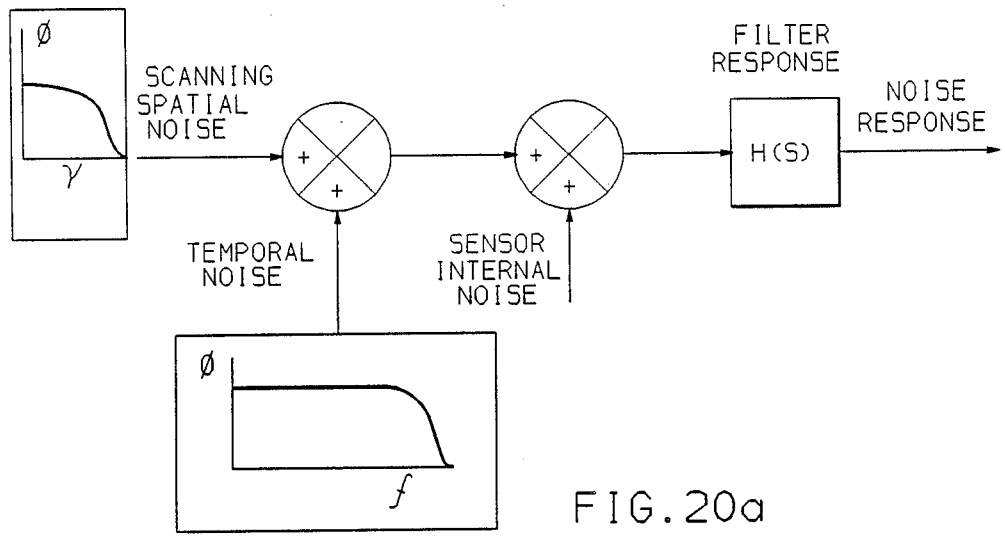
Figure 20B:
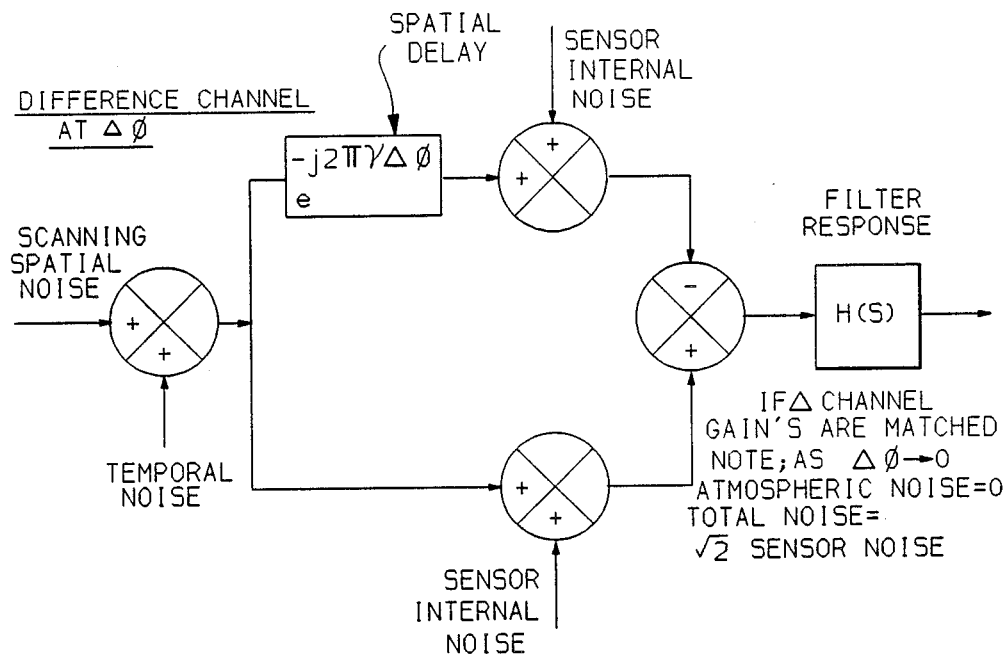

On the runway prior to take off the difference and absolute values of IR absorption at the surface can be computed via a math model (see FIG. 15a and 15b). This difference is used for calculation of the lapse rate A at 62 from the vertical radiance ratio difference data computed at 64 and obtained from the radiometer and also via a compare and filter operation indicated at 68 for range estimation, if a microburst is detected. With knowledge of the lapse rate and from the individual radiance ratios, the individual atmospheric extinction coefficients and resultant scattering can be calculated at 66. During landing approach lapse rate A can be measured continuously through independent measurements of temperature and altitude via the aircraft air data sensors. The radiometer is able to directly measure, via the ratios of vertical radiance, the difference and absolute values of extinction. If relative humidity is not available on descent it would then be possible to estimate the H2O content in the atmosphere via the IR absorption model 60 using the extinction (absorption) difference and temperature. From this result, relative humidity from 60 and atmospheric instability from block 70 can be estimated. The IR model can also estimate the absolute values of absorption at the detection wavelengths, from which the scattering contribution can be computed. Scattering contributions at all wavelengths should be approximately the same. The computations at multiple wavelengths plus the independent input or measurement of relative humidity provide desirable redundant estimation of the atmospheric variables.

Radiance measurements obtained with a small scanning instantaneous field of view (FOV) (of the order of 0.5 degrees azimuth by 2.0 degrees elevation) contain noise due to uncorrelated disturbances in the atmospheric medium. This is caused by temporal and spatial variations in temperature, scattering and absorption, along the distributed medium of radiating atmospheric particles. Atmospheric noise can limit the sensitivity of a single FOV scanning radiometer, which is measuring absolute radiance and is configured to detect amplitude changes above a certain threshold.

In view of the relatively large 1 km to 4 km diameter of the typical microburst column, and the large magnitude (>0.3 degrees C./degree azimuth) and angle (>5 degrees) over which significant gradients in radiance are expected, significant amounts of atmospheric noise can be rejected by differencing radiance signals from resolution elements separated by a small azimuth scan angle (on the order of 7 degrees). In the equivalent difference signal, correlated atmospheric noise between resolution elements is common mode rejected. A significant amount of the random noise is correlated at these small angles, such that a significant improvement in signal to noise ratio is possible in spite of the square root of 2 increase in sensor noise associated with forming the difference channel (see FIGS. 16 through 20).

With apparent signal gradients of at least 0.3 degrees C. per degree azimuth and sensor noise equivalent temperature differences of 0.05 degrees C., signal to noise ratios of at least 10:1 are possible by differencing the signal over a typical 3 degrees azimuth. This is a basic first element in the development of the spatial/temporal filtering techniques used in the image processing software. Microbursts are detected and classified based upon exceeding an amplitude threshold in the difference (gradient) channel and based on angular extent of the apparent signal amplitude. The signal amplitude is reconstructed from the integral of the difference channel output which has rejected correlated atmospheric noise of a high spatial frequency.

A similar noise rejection technique is used in elevation difference channels to reduce the sensitivity of the radiometer to both atmospheric noise and radiance noise due to aircraft/sensor attitude variations.

To confirm microburst detection and discriminate certain false alarm sources (clouds, thermals, aircraft, etc) and confirm the presence of a microburst detected by gradient measurement, it is necessary to compare the radiance measured with longer range detection channels to that measured with the short range or reference channel. This is effectively a measurement of the range gradient of the signal. A negative gradient is expected for microbursts and for other larger scale less critical wind shear conditions such as macrobursts and gust fronts. The proposed comparison is in the form of a difference in radiance. Discrimination is based on amplitude and polarity. The difference in radiance is formed by nulling detection and reference channels prior to arming on approach. Variations in atmospheric absorption and scattering vary with altitude introducing a delta radiance drift, which can be mistaken for a signal amplitude. This drift is removed through initial measurement and calibration of drift on descent prior to arming with subsequent compensation of drift using measurements of absorption and extinction.

Measurements of the vertical rate of change of radiance used for lapse rate and extinction coefficient estimation can also be used to compensate radiance data for pitch instability of the sensor line of sight in inertial space introduced by aircraft roll and pitch variations. Preferably the IR sensor contains a pitch control axis which can be used to take out low frequency stabilization errors and command the sensor to the proper line of sight for search relative to inertial space. Compensation of radiance data for roll motion of the aircraft and for higher frequency pitch disturbances can be performed in the signal processing if, as proposed, the radiance data is sampled at a frequency which is higher than the aircraft dynamics. Using available data from pitch and roll inertial sensors a combination of sensor angle positioning and radiance compensation is provided.

The embodiments of the invention in which an exclusive property or privilege is claimed are defined as:

1. A method of estimating the range of a microburst ahead of an aircraft comprising the steps of scanning the atmosphere in front of the aircraft over a predetermined azimuth angle, simultaneously detecting infrared radiation at wavelengths $\lambda_1$ and $\lambda_2$ and calculating the range to the microburst in accordance with the following equation $$r_o \approx -\frac{\ln\left[\frac{\Delta W_{r1} W_b(\lambda_2, T)[1 - e^{-(\sigma_{a2}+\sigma_{r2})L}]}{\Delta W_{r2} W_b(\lambda_1, T)[1 - e^{-(\sigma_{a1}+\sigma_{r1})L}]}\right]}{\sigma_{a1} - \sigma_{a2}}$$

where
$r_o$ is the range to the microburst
$\Delta W_{s1}$ is the difference between radiation at a first infrared wavelength $\lambda_1$ and at a reference wavelength $\lambda$ $\Delta W_{s2}$ is the difference between radiation at a second infrared wavelength $\lambda_2$ and at a reference wavelength $\lambda$
T is the ambient temperature
L is the width of the microburst
$W_b(\lambda_i, T)$ is the black body radiance at wavelength, $\lambda_i$
$\sigma_{ai}$ is the atmospheric extinction at $\lambda_i$
$\sigma_{ri}$ is the increase in extinction in the microburst due to additional moisture and rain particles.

2. A method of measuring atmospheric lapse rate from an aircraft comprising the steps of scanning a small instantaneous field of view of the atmosphere in front of the aircraft over a predetermined azimuth field of view, detecting infrared radiation simultaneously at two wavelengths and at two elevations separated by a predetermined elevation angle, in order to calculate a vertical radiance gradient of the atmosphere a predetermined distance ahead of the aircraft and computing lapse rate as a function of vertical radiance gradient and atmospheric extinction.

3. A method of advising the crew of an aircraft of atmospheric conditions conducive to windshear comprising the steps of:

a. scanning an instantaneous field of view of the atmosphere in front of the aircraft over a predetermined azimuth angle while simultaneously detecting atmospheric radiance at first and second predetermined distances in front of the aircraft and at first and second elevations separated by a predetermined elevation angle;

b. continuously computing the horizontal and vertical radiance gradient at said first and second distances and determining lapse rate as a function of vertical gradient;

c. computing a severity index as a function of lapse rate and indicating when the index exceeds a predetermined threshold;

d. determining the polarity of the horizontal gradient at said first predetermined distance relative to the gradient of the undisturbed atmosphere at said second predetermined distance;

e. indicating a microburst if the polarity is negative and the horizontal gradient and amplitude of the radiance at said first predetermined distance exceed predetermined thresholds.

4. A method of advising the crew of an aircraft of atmospheric conditions conducive to windshear comprising the steps of:

a. scanning an instantaneous field of view of the atmosphere in front of the aircraft over a predetermined azimuth angle while simultaneously detecting atmospheric radiance at far, near and reference distances in front of the aircraft and at upper and lower elevations separated by a predetermined elevation angle;

b. continuously computing the horizontal and vertical radiance gradient at said far, near and reference distances and determining lapse rate as a function of vertical gradient;

c. computing a severity index as a function of lapse rate and indicating when the index exceed a predetermined threshold;

d. determining the polarity of the horizontal gradient at said far distance relative to the gradient at said reference distance;

e. indicating a microburst if the polarity is negative and the horizontal gradient and amplitude of the radiance at said first predetermined distance exceed predetermined thresholds and f. indicating a range to the microburst as a function of the difference in infrared absorption at the far and near distances.

5. An airborne forward looking windshear detection system comprising an infrared sensor means for scanning an instantaneous field of view of the atmosphere in front of the aircraft over a predetermined azimuth angle while simultaneously detecting atmospheric radiance at first and second predetermined distances in front of the aircraft and at first and second elevations separated by a predetermined elevation angle, said infrared sensor means comprising first and second rows of detector means for measuring the atmospheric radiance at first, second and reference wavelengths respectively, a computer for processing the atmospheric radiance measured at said first and reference wavelengths to determine whether a negative azimuth gradient exists in the atmosphere, said computer processing the atmospheric radiance measured at said first and second wavelengths to determine atmospheric the lapse rate.

6. An airborne forward looking windshear detection system comprising an infrared sensor means for scanning an instantaneous field of view of the atmosphere in front of the aircraft over a predetermined azimuth angle while simultaneously detecting atmospheric radiance at first and second predetermined distances in front of the aircraft and at first and second elevations separated by a predetermined elevation angle, said infrared sensor means comprising first and second rows of detector means for measuring the atmospheric radiance at first, second and reference wavelengths respectively, within the $CO_2/H_2O$) band, a computer processing the radiance data at said first and reference wavelengths to determine whether an azimuth gradient of decreasing temperature exceeding a predetermined threshold exists in the atmosphere, said computer processing the radiance data at said first and second wavelengths to determine atmospheric lapse rate, an inertial sensor means for detecting accelerations experienced by the aircraft, said computer means processing information from said infrared sensor means to adjust the sensitivity of acceleration detection to allow an advanced reactive warning of the presence of windshear.

* * * * *